(12) United States Patent
Georgiev et al.

(10) Patent No.: US 8,019,215 B2
(45) Date of Patent: Sep. 13, 2011

(54) METHOD AND APPARATUS FOR RADIANCE CAPTURE BY MULTIPLEXING IN THE FREQUENCY DOMAIN

(75) Inventors: Todor G. Georgiev, Sunnyvale, CA (US); Chintan Intwala, Santa Clara, CA (US)

(73) Assignee: Adobe Systems Incorporated, San Jose, CA (US)

( * ) Notice: Subject to any disclaimer, the term of this patent is extended or adjusted under 35 U.S.C. 154(b) by 385 days.

(21) Appl. No.: 12/186,396

(22) Filed: Aug. 5, 2008

(65) Prior Publication Data

US 2009/0041448 A1 Feb. 12, 2009

Related U.S. Application Data

(60) Provisional application No. 60/954,238, filed on Aug. 6, 2007.

(51) Int. Cl.
*G03B 7/099* (2006.01)
(52) U.S. Cl. ......... 396/276; 396/268; 396/241; 359/738
(58) Field of Classification Search .................. 396/276
See application file for complete search history.

(56) References Cited

U.S. PATENT DOCUMENTS

| | | |
|---|---|---|
| 0,725,567 A | 9/1902 | Ives |
| 2,039,648 A | 5/1936 | Ives |
| 3,985,419 A | 10/1976 | Matsumoto et al. |
| 4,180,313 A | 12/1979 | Inuiya |
| 4,193,093 A | 3/1980 | St. Clair |
| 4,732,453 A | 3/1988 | de Montebello et al. |
| 4,849,782 A | 7/1989 | Koyama et al. |
| 5,076,687 A | 12/1991 | Adelson |
| 5,361,127 A | 11/1994 | Daily |
| 5,400,093 A | 3/1995 | Timmers |

(Continued)

FOREIGN PATENT DOCUMENTS

EP 1548481 6/2005
(Continued)

OTHER PUBLICATIONS

Levoy M., Hanrahan P.: "Light field rendering," ACM Trans. Graph. (1996), 31-42.

(Continued)

*Primary Examiner* — W. B. Perkey
*Assistant Examiner* — Bret Adams
(74) *Attorney, Agent, or Firm* — Robert C. Kowert; Meyertons, Hood, Kivlin, Kowert & Goetzel, P.C.

(57) ABSTRACT

An external mask-based radiance camera may be based on an external, non-refractive mask located in front of the main camera lens. The mask modulates, but does not refract, light. The camera multiplexes radiance in the frequency domain by optically mixing different spatial and angular frequency components of light. The mask may, for example, be a mesh of opaque linear elements, which collectively form a grid, an opaque medium with transparent openings, such as circles, or a pinhole mask. Other types of masks may be used. Light may be modulated by the mask and received at the main lens of a camera. The main lens may be focused on a plane between the mask and the main lens. The received light is refracted by the main lens onto a photosensor of the camera. The photosensor may capture the received light to generate a radiance image of the scene.

25 Claims, 15 Drawing Sheets

U.S. PATENT DOCUMENTS

| | | | |
|---|---|---|---|
| 5,659,420 | A | 8/1997 | Wakai et al. |
| 5,729,011 | A | 3/1998 | Sekiguchi |
| 5,946,077 | A | 8/1999 | Nemirovskiy |
| 6,097,541 | A | 8/2000 | Davies et al. |
| 6,137,937 | A | 10/2000 | Okano et al. |
| 6,268,846 | B1 | 7/2001 | Georgiev |
| 6,301,416 | B1 | 10/2001 | Okano et al. |
| 6,339,506 | B1 | 1/2002 | Wakelin et al. |
| 6,351,269 | B1 | 2/2002 | Georgiev |
| 6,476,805 | B1 | 11/2002 | Shum et al. |
| 6,738,533 | B1 | 5/2004 | Shum et al. |
| 6,838,650 | B1 | 1/2005 | Toh |
| 7,054,067 | B2 | 5/2006 | Okano et al. |
| 7,620,309 | B2 * | 11/2009 | Georgiev ............... 396/113 |
| 7,732,744 | B2 | 6/2010 | Utagawa |
| 7,792,423 | B2 * | 9/2010 | Raskar et al. ............ 396/268 |
| 2001/0012149 | A1 | 8/2001 | Lin et al. |
| 2001/0050813 | A1 | 12/2001 | Allio |
| 2002/0140835 | A1 | 10/2002 | Silverstein |
| 2003/0231255 | A1 | 12/2003 | Szajewski et al. |
| 2004/0114807 | A1 | 6/2004 | Lelescu et al. |
| 2004/0223214 | A1 | 11/2004 | Atkinson |
| 2005/0088714 | A1 | 4/2005 | Kremen |
| 2005/0122418 | A1 | 6/2005 | Okita et al. |
| 2008/0152215 | A1 | 6/2008 | Horie et al. |
| 2008/0165270 | A1 | 7/2008 | Watanabe et al. |
| 2008/0193026 | A1 | 8/2008 | Horie et al. |
| 2009/0041381 | A1 * | 2/2009 | Georgiev et al. ........... 382/280 |
| 2009/0041448 | A1 | 2/2009 | Georgiev |
| 2009/0140131 | A1 | 6/2009 | Utagawa |
| 2009/0185801 | A1 | 7/2009 | Georgiev et al. |
| 2010/0026852 | A1 | 2/2010 | Ng et al. |
| 2010/0085468 | A1 | 4/2010 | Park et al. |
| 2010/0265386 | A1 * | 10/2010 | Raskar et al. ............ 348/340 |

FOREIGN PATENT DOCUMENTS

| | | |
|---|---|---|
| WO | 0137025 | 5/2001 |
| WO | 2006/057838 | 1/2006 |
| WO | 2007/115281 | 10/2007 |

OTHER PUBLICATIONS

Adelson T., Wang J.: "Single Lens Stereo with a Plenoptic Camera". IEEE Transactions on Pattern Analysis and Machine Intelligence (1992), 99-106.

Ng, R., Levoy, M., Bredif, M., Duval, G., Horowitz, M. and Hanrahan, P., "Light Field Photography with a Hand-Held Plenoptic Camera," Stanford University Computer Science Tech Report CSTR Feb. 2005, Apr. 2005.

J. Chai, S. Chan, H. Shum, and X. Tong: "Plenoptic Sampling", ACM Trans. Graph., pp. 307-318, 2000.

F. Durand, N. Holzschuch, C. Soler, E. Chan, and F. Sillion: "A frequency Analysis of Light Transport," ACM Trans. Graph., pp. 1115-1126, 2005.

Todor Georgiev and Chintan Intwala: "Light Field Camera Design for Integral View Photography," Adobe Tech. Rep., 2006.

Steven J. Gortler, Radek Grzeszczuk, Richard Szeliski, and Michael F. Cohen: "The Lumigraph," ACM Trans. Graph., pp. 43-54, 1996.

Ng R.: "Fourier Slice Photography," Proceedings of ACM SIG-GRAPH 2005 (Jan. 2005).

Stevens R., Harvey T.: "Lens Arrays for a Three-Dimensional Imaging System," Journal of Optics A, vol. 4 (2002).

Wilburn B., Joshi N., Vaish V., Talvala E., Antunez E., Barth A., Adams A., Levoy M., Horowitz M.: "High Performance Imaging Using Large Camera Arrays," In ACM Trans. Graph. (2005).

Park, S., Park, M., and Kang, M., "Super-resolution image reconstruction: a technical overview," Signal Processing Magazine, 2003, 16 pages.

Brown M., Lowe D. G.: "Unsupervised 3d Object Recognition and Reconstruction in Unordered Datasets," In Proceedings of 5th International Conference on 3D Imaging and Modelling (3DIM) (2005), pp. 21-30.

David E. Roberts, History of Lenticular and Related Autostereoscopic Methods, 2003, 17 pages.

Georgiev T., Wainer M.: "Morphing Between Multiple Images," Tech. Rep. (1997).

Isaksen A., McMillan L., Gortler S. J.: "Dynamically Reparameterized Light Fields," ACM Trans. Graph. (2000), 297-306. .

Xiao J., Shah M.: "Tri-view Morphing," Computer Vision and Image Understanding 96, 3 (2004), 345-366.

Fife K., Gamal A. E., Wong H.-S. P.: A 3mpixel multi-aperture image sensor with 0.7um pixels in 0.11um cmos. In IEEE ISSCC Digest of Technical Papers (Feb. 2008), pp. 48-49.

Lee S., Wolberg G., Shin S.: "Polymorph: Morphing Among Multiple Images," IEEE Computer Graphics and Applications (1998).

Zaharia, R., et al., "Adaptive 3D-DCT Compression Algorithm for Continuous Parallax 3D Integral Imaging," Signal Processing, Image Communication, Elsevier Scient Publishers, Amsterdam, NL, vol. 17, No. 3, Mar. 1, 2002, 12 pages.

Lumsdaine A., Georgiev T.: Full Resolution Lightfield Rendering. Tech. rep., Adobe Systems, Jan. 2008, 12 pages.

Naemura T., Yoshida T., Harashima H.: "3d Computer Graphics Based on Integral Photography," Optics Express, vol. 8, 2 (2001).

Zitnick C. L., Jojic N., Kang S.: "Consistent Segmentation for Optical Flow Estimation" In Proceedings of IEEE International Conference on Computer Vision (ICCV) (2005).

Seitz S. M., Dyer C. R.: "View Morphing," ACM Trans. Graph. (1996), 21-30.

Baker S., Kanade T.: Limits on superresolution and how to break them. IEEE Transactions on Pattern Analysis and Machine Intelligence (Jan. 2002), 377 pages.

Stewart J., Yu J., Gortler S. J., McMillan L.: "A New Reconstruction Filter for Undersampled Light Field," Eurographics Symposium on Rendering (2003), 150-156.

Vaish V., Wilburn B., Joshi N., Levoy M.: "Using Plane + Parallax to Calibrate Dense Camera Arrays," In Proceedings of IEEE Conference on Computer Vision and Pattern Recognition (CVPR) (2004).

Bishop T. E., Zanetti S., Favaro P.: Light field superresolution. In International Conference on Computational Photography (Apr. 16-17, 2009), 4 pages.

U.S. Appl. No. 12/574,183, filed Oct. 6, 2009.
U.S. Appl. No. 12/144,411, filed Jun. 23, 2008.
U.S. Appl. No. 11/627,141, filed Jan. 25, 2007.
U.S. Appl. No. 11/874,611, filed Oct. 18, 2007.
U.S. Appl. No. 12/111,735, filed Apr. 29, 2008.
U.S. Appl. No. 12/271,389, filed Nov. 14, 2008.
U.S. Appl. No. 12/474,112, filed May 28, 2009.
U.S. Appl. No. 12/130,725, filed May 30, 2008.
U.S. Appl. No. 12/636,168, filed Dec. 11, 2009.
U.S. Appl. No. 12/690,569, filed Jan. 20, 2010.
U.S. Appl. No. 12/690,871, filed Jan. 20, 2010.
U.S. Appl. No. 12/503,803, filed Jul. 15, 2009.
U.S. Appl. No. 12/628,437, filed Dec. 1, 2009.
U.S. Appl. No. 12/790,677, filed May 28, 2010.

Yang, J C, et al., "A Real-Time Distributed Light Field Camera," Rendering Techniques 2002, Eurographics Workshop Proceedings, PIS, Italy, Jun. 26-28, 2002, 9 pages.

Levin A., Fergus R., Durand F., Freeman W.: Image and depth from a conventional camera with a coded aperture. ACM Transactions on Graphics, SIGGRAPH 2007 Conference Proceedings, San Diego, CA (2007), 10 pages.

Lin Z., Shum H.: Fundamental limits of reconstruction-based super-resolution algorithms under local translation. IEEE Transactions on Pattern Analysis and Machine Intelligence 26, 1 (Jan. 2004), 83-97.

Ng M. K., Bose N. K.: Mathematical analysis of super-resolution methodology. Signal Processing Magazine, IEEE 20, 3 (2003), 62-74.

Schultz R.: Super-resolution enhancement of native digital video versus digitized NTSC sequences. In Proceedings of the Fifth IEEE Southwest Symposium on Image Analysis and Interpretation (2002), pp. 193-197.

Lumsdaine A., Georgiev T.: The focused plenoptic camera. In International Conference on Computational Photography (Apr. 2009), 8 pages.

Georgiev T., Lumsdaine A: Depth of field in plenoptic cameras. In Eurographics 2009—Annex (Apr. 2009), pp. 5-8.

J. Neumann, et al., "Eyes from Eyes Analysis of Camera Design Using Plenoptic Video Geometry," Dec. 2001, 20 pages, XP002509893.

Zhang, et al., "A Survey on Image-based Rendering-Representation, Sampling and Compression," Signal Processing, Image Communication, Elsevier Science Publishers, vol. 19, No. 1, Jan. 1, 2004, 28 pages.

Heung-Yeung Shum, et al., "Survey of Image-Based Representations and Compression Techniques," IEEE Transactions on Circuits and Systems for Video Technology, IEEE Service Center, vol. 13, No. 11, Nov. 1, 2003, 18 pages.

Shing-Chow, Chan, et al., "The Compression of Simplified Dynamic Light Fields," Proceedings of International Conference on Acoustics, Speech and Signal Processing, Apr. 6-10, 2003 Hong Kong, vol. 3, Apr. 6, 2003, 4 pages.

Ulrich, Fecker, et al., "Transposed Picture Ordering for Dynamic Light Field Coding," Joint Video Team (JVT) of ISO/IEC MPEG & ITU-T VGEG (ISO/IEC JTC1/SC29/WG11 and ITU-T SG16 Q6), Jul. 9, 2004, 8 pages.

Grzeszczuk, R., et al., "Standard Support for 1-13 Progressive Encoding, Compression and Interactive Visualization of Surface Light Fields," Joint Video Tem (JVT) of ISO/IEC MPEG & ITU-T VGEG (ISO/IEC JTC1/SC29/WG11 and ITU-T SG16 Q6), Nov. 21, 2001, 11 pages.

Chang, et al., "Light Field Compression Using Disparity-Compensated Lifting and Shape Adaptation," IEEE Transactions on Image Processing, vol. 15, No. 4, Apr. 2006, pp. 793-806.

Sebe, et al., "Mutli-View Geometry Estimation for Light Field Compression," VMV 2002, 8 pages.

Borman, S., and Stevenson, R., "Super-resolution from image sequences—a review", Proceedings of the 1998 Midwest Symposium on Circuits and Systems, Publication Date: Aug. 9-12, 1998, on pp. 374-378.

Elad, M., and Feuer, A., "Restoration of a single superresolution image from several blurred, noisy, and undersampled measured images," IEEE Transactions on Image Processing Dec. 1997, pp. 1646-1658.

Farsiu, S., Robinson, D., Elad, M., and Milanfar, P., "Advances and challenges in super-resolution," International Journal of Imaging Systems and Technology, 2004, 12 pages.

Levoy, et al. "Recording and controlling the 4D light field in a microscope using microlens arrays", Journal of Microscopy, 2009, 19 pages.

Dana Dudley, Walter Duncan, John Slaughter, "Emerging Digital Micromirror Device (DMD) Applications", DLPTM Products New Applications, Texas Instruments, Inc., Copyright 2003 Society of Photo-Optical Instrumentation Engineers., This paper was published in SPIE Proceedings vol. 4985, 12 pages.

Shree K. Nayar, Vlad Branzoi, Terry E. Boult, "Programmable Imaging using a Digital Micromirror Array", Shree K. Nayar, Vlad Branzoi, Terry E. Boult, In Conf. on Computer Vision and Pattern Recognition, pp. I: 436-443, 2004.

International Search Report from PCT/US2008/072247 mailed on Nov. 7, 2008.

Georgiev, et al., Light-Field Capture by Multiplexign in the Frequency Domain, Adobe Technical Report, 14 pages, Mar. 2003.

Georgiev, et al., "Eurographics Symposium on Rendering," 2006, XP002501299.

Ren Ng, et al., "Light Field Photography with a Hand-held Plenoptic Camera," Internet Citation, XP002423384, retrieved Mar. 6, 2007 from http://graphics.standford.edu/papers/lfcamera/lfcamera-150dpi.pdf.

Veeraraghavan, et al., "Dappled Photography: Mask Enhanced Cameras for Heterodyned Light Fields and Coded Aperture Refocusing," ACM Transaction on Graphics, vol. 26, No. 3, 2006, XP002491494.

M. Levoy, "Light Fields and computational Imaging," Computer [Online], vol. 39, No. 8, Aug. 2006, pp. 46-55, XP002501300.

International Search Report from PCTU/US2008/072247 mailed Nov. 11, 2008.

* cited by examiner

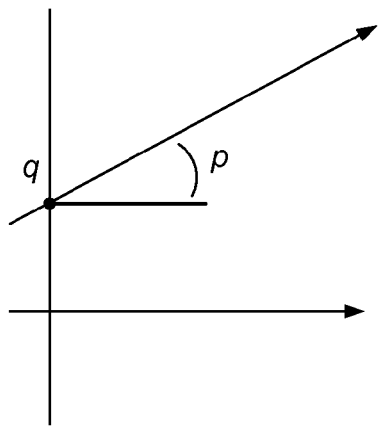
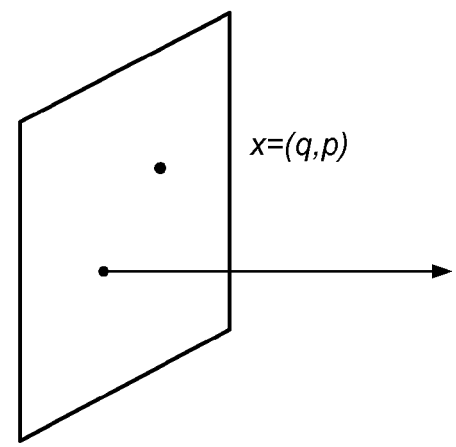
Figure 2a          Figure 2b
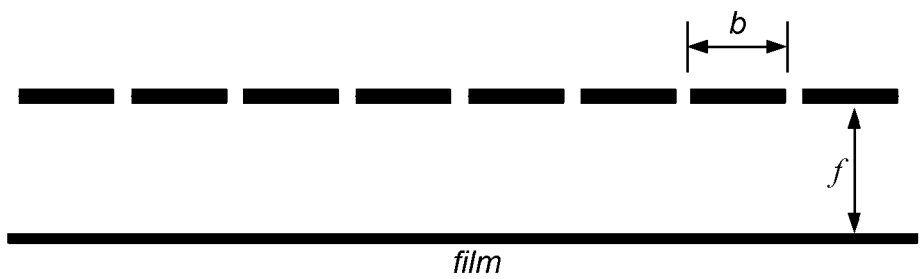
Figure 3

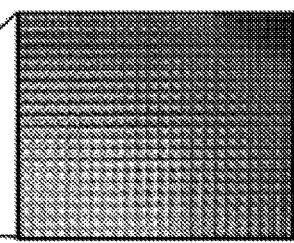
*Figure 5b*
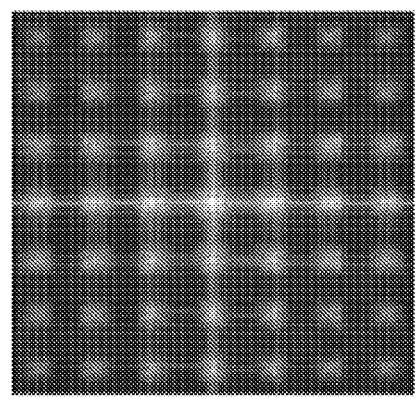
*Figure 5a*
*Figure 5c*
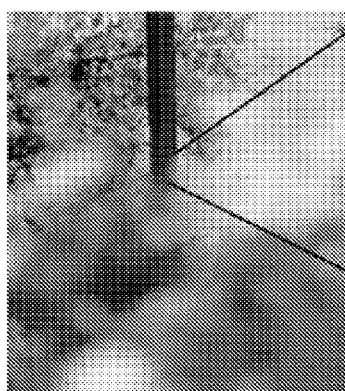
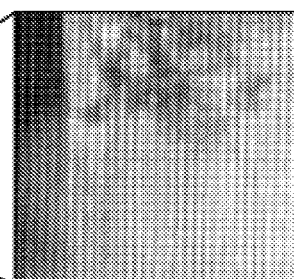
*Figure 6b*
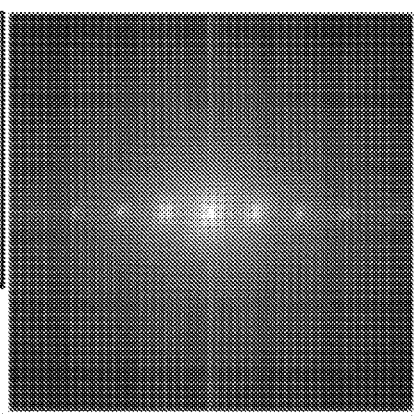
*Figure 6a*
*Figure 6c*
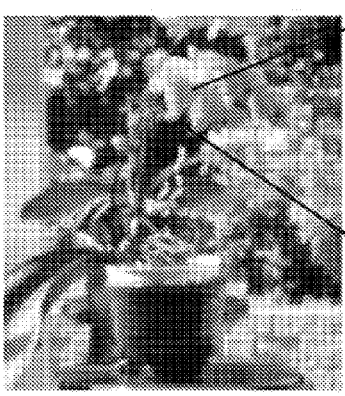
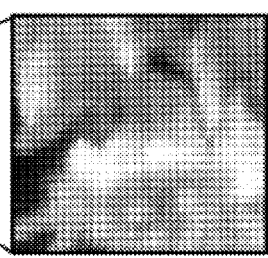
*Figure 7b*
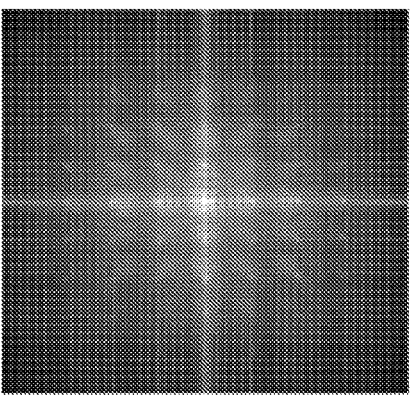
*Figure 7a*
*Figure 7c*

 
Figure 9a            Figure 9b
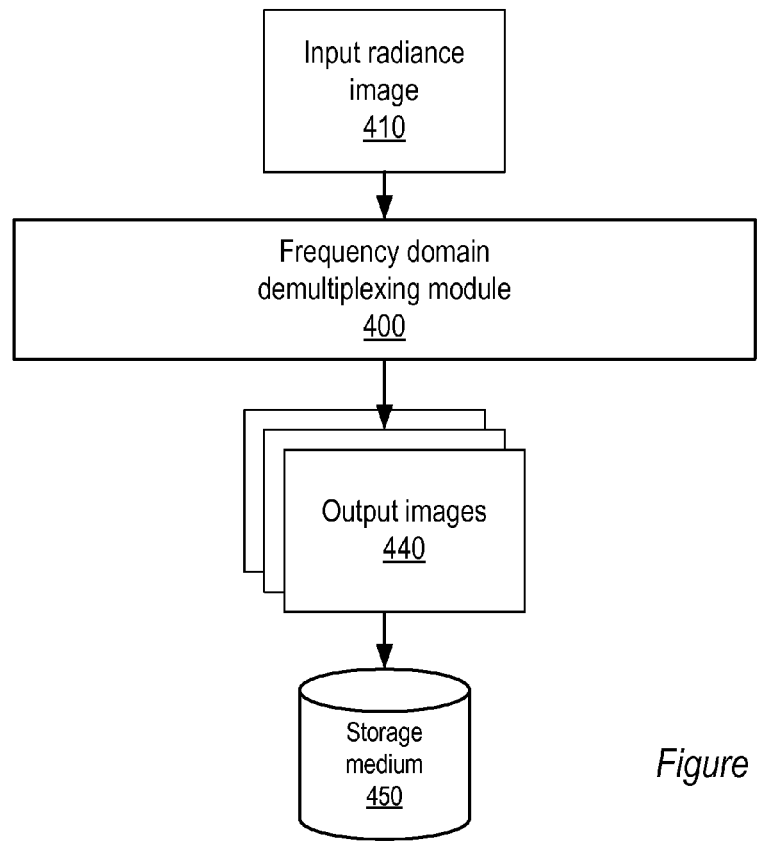
Figure 10

Mask 302A

Mask 302B

Mask 302C

Mask
302D

Mask
302E

Mask
302F

US 8,019,215 B2

METHOD AND APPARATUS FOR RADIANCE CAPTURE BY MULTIPLEXING IN THE FREQUENCY DOMAIN

PRIORITY INFORMATION

This application claims benefit of priority of U.S. Provisional Application Ser. No. 60/954,238 entitled "Light-Field Capture by Multiplexing in the Frequency Domain" filed Aug. 6, 2007, the content of which is incorporated by reference herein in its entirety.

BACKGROUND

Description of the Related Art

Conventional cameras fail to capture a large amount of optical information. In particular, a conventional camera does not capture information about the location on the aperture where different light rays enter the camera. During operation, a conventional digital camera captures a two-dimensional (2-D) image representing a total amount of light that strikes each point on a photosensor within the camera. However, this 2-D image contains no information about the directional distribution of the light that strikes the photosensor. Directional information at the pixels corresponds to locational information at the aperture.

Light-field or Radiance Photography

In contrast to conventional cameras, light-field, or radiance, cameras sample the four-dimensional (4-D) optical phase space, or radiance, and in doing so capture information about the directional distribution of the light rays. This information captured by radiance cameras may be referred to as the light-field, the plenoptic function, or radiance. In computational photography, radiance is a four-dimensional (4-D) record of all light rays in 3-D. Radiance describes both spatial and angular information, and is defined as density of energy per unit of area per unit of stereo angle (in radians). A radiance camera captures radiance; therefore, radiance images originally taken out-of-focus may be refocused, noise may be reduced, viewpoints may be changed, and other radiance effects may be achieved.

Conventional cameras, based on 2-D image sensors, are simply integration devices. In a typical setting, conventional cameras integrate over a 2-D aperture to produce a 2-D projection of the four-dimensional (4-D) radiance. Integral, or light-field, photography was proposed more than a century ago to "undo" the integration and measure the complete 4-D radiance arriving at all points on a film plane or photosensor. Thus, integral photography captures radiance as opposed to capturing a flat 2-D picture. The light itself, or radiance, may be mathematically described by the radiance density function, which is a complete representation of light energy flowing along "all rays" in 3-D space. This density is a field defined in the 4-D domain of the optical phase space, the space of all lines in 3-D with symplectic structure. Capturing the additional two dimensions of radiance data allows the rays of light to be re-sorted in order to synthesize new photographs, which may be referred to as novel views. Advantages of radiance photography include gaining information about the 3-D structure of the scene as well as the ability of optical manipulation or editing of the images, such as refocusing and novel view synthesis.

Radiance may be captured with a conventional camera. In one conventional method, M×N images of a scene are captured from different positions with a conventional camera. If, for example, 8×8 images are captured from 64 different positions, 64 images are produced. The pixel from each position (i, j) in each image are taken and placed into blocks, to generate 64 blocks.

FIG. 1a illustrates an exemplary prior art light-field camera, or camera array, which employs an array of two or more objective lenses 110. Each objective lens focuses on a particular region of photosensor 108, or alternatively on a separate photosensor 108. This light-field camera 100 may be viewed as a combination of two or more conventional cameras that each simultaneously records an image of a subject on a particular region of photosensor 108 or alternatively on a particular photosensor 108. The captured images may then be combined to form one image.

FIG. 1b illustrates an exemplary prior art integral camera, or plenoptic camera, another type of light-field camera, which employs a single objective lens and a microlens or lenslet array 106 that includes, for example, about 100,000 lenslets. Lenslet array 106 is typically placed a small distance (~0.5 mm) from a photosensor 108, e.g. a charge-coupled device (CCD). The raw image captured with a plenoptic camera 102 is made up of an array of small images, typically circular, of the main camera lens 108. These small images may be referred to as microimages. The lenslet array 106 enables the plenoptic camera 102 to capture the radiance, i.e. to record not only image intensity, but also the distribution of intensity in different directions at each point. Each lenslet splits a beam coming to it from the main lens 104 into rays coming from different "pinhole" locations on the aperture of the main lens 108. Each of these rays is recorded as a pixel on photosensor 108, and the pixels under each lenslet collectively form an n-pixel image. This n-pixel area under each lenslet may be referred to as a macropixel, and the camera 102 generates a microimage at each macropixel. The plenoptic photograph captured by a camera 102 with, for example, 100,000 lenslets will contain 100,000 macropixels, and thus generate 100,000 microimages of a subject. Each macropixel contains different angular samples of the light rays coming to a given microlens. Each macropixel contributes to only one pixel in the different angular views of the scene. As a result, each angular view contains 100,000 pixels.

Another type of light-field camera is somewhat similar to the plenoptic camera of FIG. 1b, except that an array of pinholes is used between the main lens and the photosensor instead of an array of lenslets.

Yet another type of light-field camera is similar to the plenoptic camera of FIG. 1b, except that a non-refractive cosine mask is used between the main lens and the photosensor instead of an array of lenslets. The cosine mask is a non-refractive element, and modulates the incoming light rays but does not refract the light. The captured image is the convolution of the incoming light field with the mask light field. This camera design captures the 4-D light field directly in the Fourier domain. Thus, a 2-D sensor pixel represents a coded linear combination of several rays. The linear combination can be decoded by software to obtain the 4-D light field.

Frequency Domain Analysis of Radiance

Techniques for analyzing radiance in the frequency domain have been developed, among which are application of Poisson summation formula to depth representation of scenes, light fields and displays, light transport and optical transforms, Fourier slice theorem applied to refocusing, and others. However, frequency domain analysis has not been applied directly to the understanding and design of light-field, or radiance, cameras in general. Moreover, frequency domain processing has been limited to mask-based radiance cameras that employ sinusoidal (e.g., cosine) masks.

SUMMARY

Various embodiments of a mask-based radiance camera are described that multiplex radiance in the frequency domain by optically mixing different spatial and angular frequency components of the light received from a scene, and capture the radiance information at a photosensor. Embodiments of a mask-based radiance camera based on an external, non-refractive mask located in front of the main or objective camera lens, rather than between the main lens and the photosensor or film, are described. In addition, an internal mask-based camera based on a medium- or large-format conventional camera with a film back, and a non-refractive mask that may be placed in the film back adjacent to the film, with optional spacers that may be placed between the mask and the film, is described. While both types of mask-based cameras employ periodic masks, neither is limited to sinusoidal (i.e., cosine) masks.

Various exemplary embodiments of non-refractive masks are described. The masks are non-refractive; that is, while the masks may act to modulate and/or attenuate the light, the masks do not act to bend the light rays. An exemplary embodiment is a mesh mask, which also may be referred to as a net or screen. The mesh may include horizontally and vertically arranged opaque linear elements or grid lines, which collectively form a grid that modulates, but does not refract, light received from a scene located in front of the camera as the received light passes through the grid. Generally, the opaque grid lines may be equally spaced in the two dimensions. Thus, the opaque grid lines act to form or define rows and columns of periodically spaced transparent (i.e., through which light may pass), non-refractive openings.

Another exemplary embodiment of a mask includes transparent circular openings, through which light may pass, in an opaque medium or surface. The circular openings in may be periodically spaced, and arranged in horizontal rows and vertical columns. Other geometric shapes than circles may be used in other embodiments, e.g. squares, hexagons, rectangles, etc. Another exemplary mask is composed of a grid or array of pinholes, and may be referred to as a pinhole mask. The pinholes, which also may be referred to as openings, may typically be, but are not necessarily, circular. The pinholes may be periodically spaced, and arranged in horizontal rows and vertical columns.

While various examples of masks are described, in general, any of various types of periodic masks may be used as a non-refractive mask in embodiments. In addition, while the masks are described as periodic, the periodicity may be arbitrary. In other words, the masks that may be used in embodiments of an external mask-based radiance camera are not limited to sinusoidal masks such as sine masks and/or cosine masks. The various embodiments of masks may be used with either the external mask-based radiance camera embodiments or the internal mask-based radiance camera embodiments with appropriate physical configuration to match the particular camera application.

Various types of cameras may be used in embodiments of the external mask-based radiance camera, including both film-based and digital cameras, and standard, medium or large-format cameras. A non-refractive mask may be integrated with the camera, or alternatively attachable to the camera, with the mask positioned in front of the main lens so that light from a scene to be photographed arrives at the main lens after passing through and being modulated by the mask. The mask is a non-refractive element, and modulates and/or attenuates the incoming light rays but does not bend the rays. In one embodiment, the main lens may be focused on a plane just behind the mask, between the mask and the main lens. Light is refracted by the main lens onto a photosensor, which may in turn operate to capture a radiance image of the scene.

In one embodiment of a method of capturing a radiance image with an external mask-based radiance camera, light from a scene may be received at a mask. The mask is a non-refractive element, and modulates and/or attenuates the incoming light rays but does not bend them. Light that passes through the mask is received at the main lens of a camera. The main lens may be focused on a plane between the mask and the main lens, and proximate to the mask. The received light is refracted by the main lens onto a photosensor of the camera. The photosensor may capture the received light to generate a radiance image of the scene. In some embodiments of the camera, the captured radiance image may be stored to a memory medium or memory device.

Embodiments of an internal mask-based radiance camera based on a medium- or large-format film camera with a film back. In one embodiment, a mechanism inside the film back of the film camera holds the mask so that a flat side of the mask is pressed against the film and the surface of mask on which the opaque surface or medium is painted, attached, etc., with openings that are the transparent portion of the mask is away from the film. In one embodiment, the thickness of the mask is such that, when placed against the film, the opaque surface of the mask, and the openings therein, is at a distance f (equivalent to the focal length of the mask) from the film. In one embodiment, spacers may be used between the mask and the film in film holder to increase the distance from the mask and the film to allow f (equivalent to the focal length of the mask) to be changed, for example to match a changed F/number for the main lens. Additional spacers may be added to provide additional spacing.

The angular information of radiance images captured with embodiments of an external mask-based radiance camera or with embodiments of an internal mask-based radiance camera may be demultiplexed using an embodiment of a frequency domain demultiplexing method described herein to generate multiple views of a scene. If the radiance was captured to film, the radiance image may be digitized from the film, for example using a film negative or photograph scanner, to generate a digital version of the radiance image that may be stored to a memory medium and/or processed by the frequency domain demultiplexing method.

BRIEF DESCRIPTION OF THE DRAWINGS

FIG. 2a illustrates the geometric representation of a ray as position and angle in an optical system.

FIG. 2b illustrates the same ray as in FIG. 2b, but described as a point, or a vector, in a 2-D space.

FIG. 3 illustrates a light-field camera employing an array of pinholes.

FIG. 5a illustrates an exemplary image obtained from a lens-based radiance camera.

FIG. 5b illustrates a zoom-in of a region of the image illustrated in FIG. 5a.

FIG. 5c illustrates the magnitude of the 2-D Fourier transforms of the image illustrated in FIG. 5a.

FIG. 6a illustrates an exemplary image obtained from a mask-based radiance camera.

FIG. 6b illustrates a zoom-in of a region of the image illustrated in FIG. 6a.

FIG. 6c illustrates the magnitude of the 2-D Fourier transforms of the image illustrated in FIG. 6a.

FIG. 7a illustrates an exemplary image obtained from an external mask-based radiance camera.

FIG. 7b illustrates a zoom-in of a region of the image illustrated in FIG. 7a.

FIG. 7c illustrates the magnitude of the 2-D Fourier transforms of the image illustrated in FIG. 7a.

FIGS. 9a and 9b illustrate a method of correcting the effect of waves due to small shifts or misalignments in the FFT, according to one embodiment.

FIG. 10 illustrates a frequency domain demultiplexing module, according to one embodiment.

FIG. 11b shows the absolute value of the Fourier transform of the radiance image of FIG. 11a.

Figure 1A:
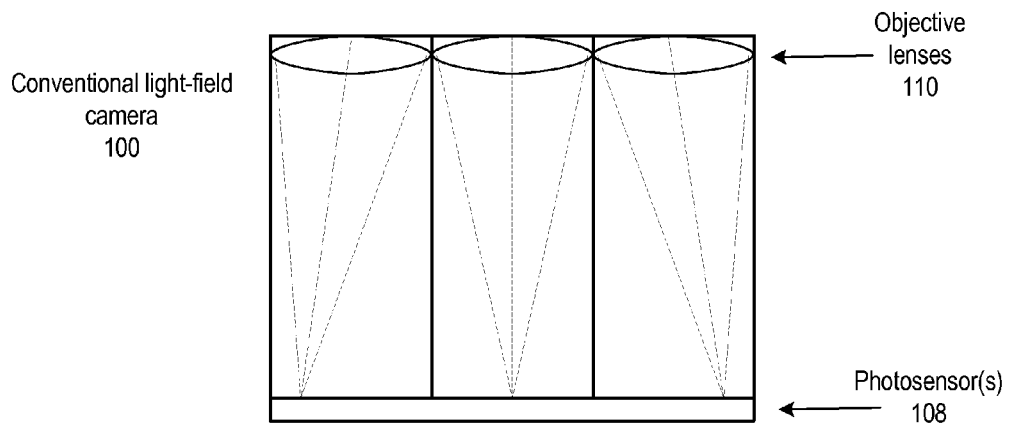
FIG. 1a illustrates an exemplary prior art light-field camera, or camera array.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a method and apparatus for capturing radiance in the frequency domain, and demultiplexing the captured radiance in the frequency domain, are described. Various embodiments of light-field, or radiance, cameras, including both mask-based and lens-based radiance cameras, are described that multiplex the radiance in the frequency domain by optically mixing different spatial and angular frequency components and capturing the signal via a photosensor (e.g., conventional film or an electronic sensor such as a charge-coupled device (CCD)). Some embodiments of the radiance camera may be based on arrays of "active" optical elements, such as lenses and prisms. Other embodiments of the radiance camera may be based on "passive" optical elements, or masks, such as meshes or grids of circles or pinholes. Both types of radiance cameras may be understood and described according to a mathematical formalism in the frequency domain.

In the following sections, a mathematical analysis of radiance cameras in the frequency domain is provided. A method of multiplexing the 3-D radiance onto the 2-D sensor is demonstrated that works in the frequency domain for various radiance cameras, including both lens-based and mask-based radiance cameras. It is also demonstrated that the F/number matching condition known to exist for lens-based radiance cameras is a requirement for all radiance cameras. This helps in constructing and adjusting various mask- and lens-based radiance cameras so that the cameras produce higher quality radiance images.

A mathematical method for recovering (demultiplexing) the multiplexed spatial and angular information from the frequency representation is also described, and is shown to be applicable to radiance images captured by both lens-based and mask-based radiance cameras, including radiance images captured with mask-based cameras that employ any periodic mask. This method may be referred to as a frequency domain demultiplexing method. The frequency domain demultiplexing method may, for example, be implemented in a computer software program or module, referred to herein as a frequency domain demultiplexing module.

Conventionally, frequency domain demultiplexing methods similar to the frequency domain demultiplexing method described herein have been limited to radiance images captured specifically with mask-based radiance cameras that use sinusoidal (i.e., cosine or sine) masks. Embodiments of the frequency domain demultiplexing method are described for which it is shown that the method may be used to demultiplex radiance information from images captured with mask-based radiance cameras that use any periodic mask, not just sinusoidal masks, and for which it is also shown that the method may to demultiplex radiance information captured with lens-based radiance cameras in addition to mask-based cameras.

In addition, embodiments of a radiance camera based on an external mask, e.g. a periodic screen, mesh or grid of openings, such as pinholes or circles, in an opaque surface or element located in front of the main camera lens, rather than between the main lens and the photosensor or film, are described. Furthermore, embodiments of a radiance camera based on an internal periodic but non-sinusoidal mask located in between the main camera lens and the photosensor or film, are described.

Frequency Domain Representation

Let r(x) be the radiance in conventional x-space. This can be represented in frequency domain as follows:

$$R(\omega) = \int r(x) e^{i\omega x} dx \quad (1)$$

The following notations are used. The spatio-angular coordinates of a ray at a given plane orthogonal to the optical axis are represented as a vector:

$$x = \begin{pmatrix} q \\ p \end{pmatrix} \quad (2)$$

where q is the location of ray-plane intersection, and p is a vector defining the two angles of that ray at location q. Paraxial approximation is used, assuming the angle is small. A 2-dimensional vector representation of a ray is shown in FIGS. 2a and 2b. FIG. 2a illustrates the geometric representation of a ray as position and angle in an optical system. FIG. 2B illustrates the same ray as in FIG. 2b, but described as a point, or a vector x=(q, p), in a 2-D space.

The spatial frequency $\omega_q$ and the angular frequency $\omega_p$ may be represented in a similar way as a 4-D vector:

$$\omega = \begin{pmatrix} \omega_q \\ \omega_p \end{pmatrix} \quad (3)$$

To simplify the description and the Figures, 2-D radiance with 1-dimensional position q and angle p for each ray may be used. The dot product may be defined as:

$$\omega \cdot x = \omega_q q + \omega_p p$$

Transformations of the Radiance

The following summarizes and extends transformations of radiance in optical systems. A ray x may be transformed as described below.

Both lens L and translation T may be described by linear transforms $x' = A_x$ of the ray as a position-angle vector (see equation (2)) by the following matrices:

$$L = \begin{pmatrix} 1 & 0 \\ -\frac{1}{f} & 1 \end{pmatrix} \quad (4)$$

$$T = \begin{pmatrix} 1 & t \\ 0 & 1 \end{pmatrix} \quad (5)$$

where f is the focal length of the lens, and t is the translation (distance of flight). A prism deviates the ray by a fixed angle $p_{prism}$, so that $p' = p + p_{prism}$.

The combined action of several such elements may be described by the composition of all those elements. This provides the ability to build the model of essentially any optical system, such as a multi-element camera lens or radiance camera, as a linear or affine transform.

In a non-absorbing optical system, the radiance is conserved. In other words, the radiance does not change along a ray during travel or transformation by optical elements. The mathematical representation of this fact is that any optical matrix is symplectic. The following property of the transforms, that the determinant of any optical matrix is 1, may be used herein:

$$\det A = 1 \quad (6)$$

The above may also be seen directly from equations (4) and (5).

Based on the above-mentioned conservation law that, n a non-absorbing optical system, the radiance is conserved, the radiance r' after a transform is related to the radiance r before the transform by the following equation:

$$r'(x) = r(x_0) = r(A^{-1} x) \quad (7)$$

where $x_0$ is the ray, which has been mapped into x by the optical transformation A, i.e. $x = A x_0$.

Equation (7) may be expressed in frequency representation as follows:

$$R'(\omega) = \int r'(x) e^{i\omega x} dx \quad (8)$$
$$= \int r(A^{-1}x) e^{i\omega x} dx$$
$$= \int r(A^{-1}x) e^{i\omega A A^{-1} x} dx$$
$$= \int r(x_0) e^{i\omega A \cdot x_0} dx_0$$
$$= R(A^T \omega)$$

where $A^T$ is the transposed matrix, and equation (6) is used for the change of variables from x to $x_0$. Note that this expression is derived for any optical transform A, while conventional works have only considered the special cases.

The above results may be summarized as follows:

$$x' = Ax \quad (9)$$

$$r'(x) = r(A^{-1} x) \quad (10)$$

$$R'(\omega) = R(A^T \omega) \quad (11)$$

Radiance Cameras in the Frequency Domain

The Pinhole Light-field Camera

One type of radiance camera, which may be referred to as a pinhole light-field camera, may be described as an array of pinhole cameras with the same focal distance f, as illustrated in FIG. 3. This array of "cameras" may be placed at the focal plane of a conventional camera, typically but not necessarily a large format camera. Note that, in FIG. 3, only the focal plane with the array of pinholes is represented.

The mathematical representation for the radiance transformations inside a pinhole light-field camera in the frequency domain is described below. This representation may be used throughout the description.

Consider a 1-dimensional pinhole light-field camera and the corresponding 2-D radiance. Just before the array of pinholes, the radiance is:

$$r(x) = r(q, p)$$

Just after the array of pinholes, the radiance is:

$$r'(q, p) = r(q, p) \sum_{m=-\infty}^{\infty} \delta(q - mb) \quad (1)$$

where b is the pitch (distance between pinholes). In frequency representation this radiance may be written based on the Poisson summation formula as:

$$R'(\omega) = \int r(q, p) \sum_m \delta(q - mb) e^{i\omega x} dx \qquad (13)$$

$$= \frac{1}{b} \int r(q, p) \sum_n e^{in\frac{2\pi q}{b}} e^{i(\omega_q q + \omega_p p)} dq dp$$

$$= \frac{1}{b} \sum_n R\left(\omega_q + n\frac{2\pi}{b}, w_p\right)$$

Figure 4A:
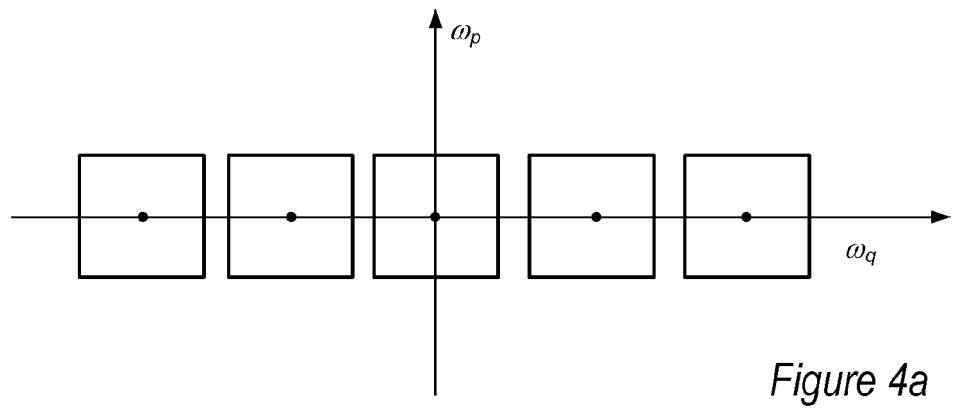
FIG. 4a illustrates, in the frequency domain, a band-limited signal after the array of pinholes.
Figure 4B:
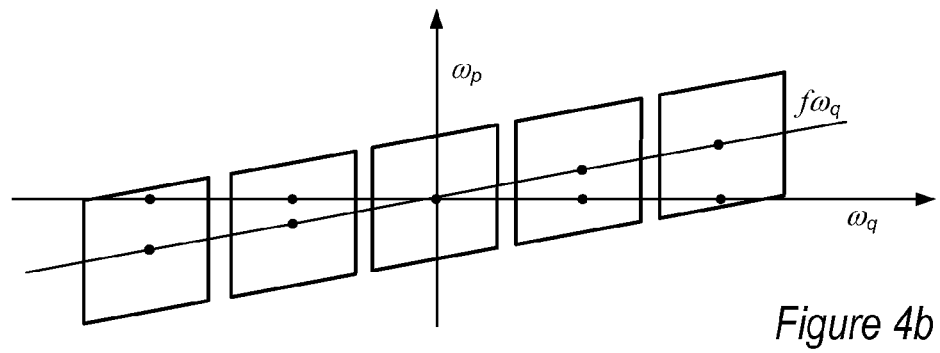
FIG. 4b illustrates the shear of the signal after traveling a distance f.

Assuming a band-limited signal, this result shows that the radiance after the pinholes consists of multiple copies of the original radiance, shifted in their frequencies by:

$$n\frac{2\pi}{b}$$

for all integers n, as shown in FIG. 4a, which illustrates a band-limited signal after the array of pinholes. FIG. 4b illustrates the shear of the signal after traveling a distance f.

After traveling a distance f from the pinholes to the image plane, the radiance is transformed by the translation matrix (5) transposed, according to equation (11). The resultant radiance $R_f$ that reaches the film plane is:

$$R_f(\omega) = \sum_{n=-\infty}^{\infty} R\left(\omega_q + n\frac{2\pi}{b}, f\omega_q + \omega_p\right) \qquad (14)$$

It can be seen that the signal is sheared in the direction of angular frequency. This is represented in FIG. 4b, which illustrates the shear of the signal after traveling a distance f. An observation is that a different angular part of each copy intersects with the $\omega_q$ axis. Since the film (or sensor) responds only to the zero angular frequency, it records only the thin slice where the spectrum intersects with the $\omega_q$ axis.

Figure 4C:
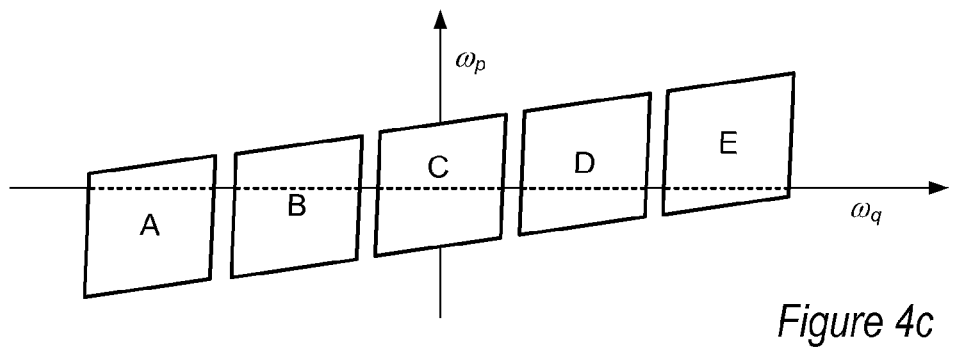
FIGS. 4c and 4d illustrate reconstructing the original signal before the array of pinholes by combining samples at different intersections with the $\omega_q$ axis.
Figure 4D:
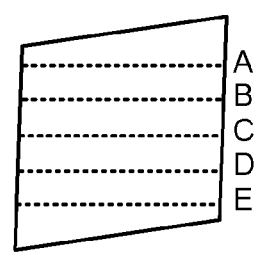

By picking up slices in the image at different angular frequencies and stacking the slices along the $\omega_q$ axis, the original signal $R(\omega_q, \omega_p)$ may be reconstructed, as shown in FIGS. 4c and 4d which illustrate reconstructing the original signal before the pinhole array by combining samples at different intersections with the $\omega_q$ axis. Finally, an inverse Fourier transform may be applied to convert the radiance into the familiar spatio-angular representation r(x).

Figure 8:
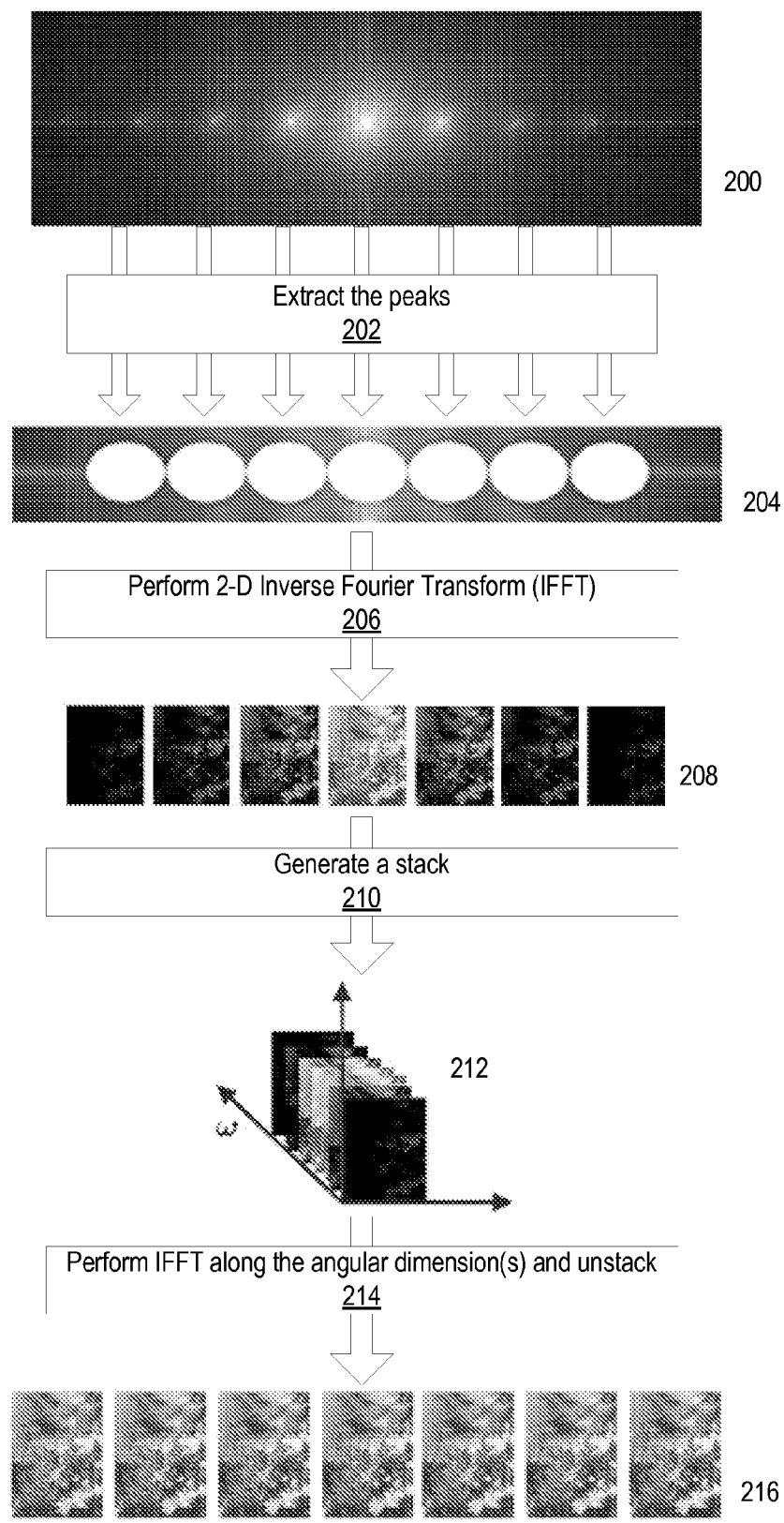
FIG. 8 illustrates a method of demultiplexing the angular information of an image captured using a radiance camera, according to one embodiment.

From the above analysis of a pinhole light-field camera in the frequency domain, radiance capture by multiplexing in the frequency domain may be applied to pinhole light-field cameras. A frequency domain demultiplexing method may be applied to the captured radiance to demultiplex the radiance information. The angular information of radiance images captured with a pinhole light-field camera may, for example, be demultiplexed using a frequency domain demultiplexing method as illustrated in FIG. 8 to generate multiple parallax views of a scene. In addition, while a pinhole array is periodic, the periodicity of the pinholes in the array may be arbitrary. In other words, the pinhole arrays that may be used as a mask in a pinhole light-field or radiance camera are not limited to sinusoidal masks such as sine masks and/or cosine masks.

Replacing the Pinhole Array with a lens array—the integral camera

The pinholes in the pinhole light-field camera design may be replaced with lenses. Just as with a single pinhole camera, lenses gather much more light and produce better image quality than small pinholes. Such a radiance camera may be referred to as an integral camera. Different versions of the integral camera have been proposed, including the plenoptic camera illustrated in FIG. 1b.

An analysis of the integral camera in frequency space may be performed according to the following:

An array of pinholes, as in the pinhole camera, may be considered, only shifted by a constant (for all pinholes) vector a. Each pinhole is covered by a prism with angle of deviation depending on the shift, defined as $$p_{prism} = \frac{a}{f}.$$

The superposition of multiple arrays of such pinhole-prisms may be considered, and it may be shown that they all contribute to the final image in the same way. A conventional integral camera may be based on this coherent action of different arrays. Such a camera may be viewed as the limiting case where the plane is made completely of pinhole-prisms and all the light goes through. Each microlens is formed by the corresponding prisms, as a Fresnel lens.

Following the above derivation for the pinhole light-field camera in equation (13), the radiance after the pinhole-prism array may be expressed as:

$$R'(\omega) = \int r\left(q, p + \frac{a}{f}\right) \sum_m \delta(q - mb - a) e^{i\omega x} dx \qquad (15)$$

$$= \frac{1}{b} \int r\left(q, p + \frac{a}{f}\right) \sum_n e^{in\frac{2\pi(q-a)}{b}} e^{i(\omega_q q + \omega_p p)} dq dp$$

$$= \frac{1}{b} \sum_n e^{-i\left(\omega_p \frac{a}{f} + n\frac{2\pi a}{b}\right)} R\left(\omega_q + n\frac{2\pi}{b}, \omega_p\right)$$

Note that additional phase multipliers are now present in each term of the sum. After the pinhole-prism array, the light travels a distance f to the film plane. Using equations (5) and (9), the following expression for the radiance at the film (sensor) may be obtained:

$$R_f(\omega) = \frac{1}{b} \sum_n e^{-i\left((f\omega_q + \omega_p)\frac{a}{f} + n\frac{2\pi a}{b}\right)} R\left(\omega_q + n\frac{2\pi}{b}, f\omega_q + \omega_p\right)$$

As explained above, the film (or sensor) only records zero angular frequencies. Therefore, by restricting $\omega$ to the $\omega_q$ axis, the following expression may be obtained:

$$R_f(\omega_q, 0) = \frac{1}{b} \sum_n e^{-i\left(\omega_q a + n\frac{2\pi a}{b}\right)} R\left(\omega_q + n\frac{2\pi}{b}, f\omega_q\right) \qquad (16)$$

An effect of coherence may be easily observed for a small a. It takes place due to the term:

$$\omega_q a + n\frac{2\pi a}{b}$$

where $\omega_q$ is within $$\frac{\pi}{b}$$

from the corresponding center (peak), which is at frequency $$n\frac{2\pi}{b}$$

in each block. For every exponential term with frequency $\omega_q$, there is another term with frequency:

$$-n\frac{2\pi}{b} - \omega_q$$

inside the same block, but on the other side of the center. Those two frequencies produce opposite phases, which results in a real positive term:

$$\cos\left(\left(\omega_q + n\frac{2\pi}{b}\right)a\right)$$

This term for a small a is close to 1 for all rays.
Based on this analysis, the integral camera will also work with lenses for which a can be as big as $$\frac{b}{2}$$

and the area of the plane is completely covered. All the terms are still positive, but the efficiency of rays far from the center is lower, and high frequencies will be attenuated.

Figure 1B:
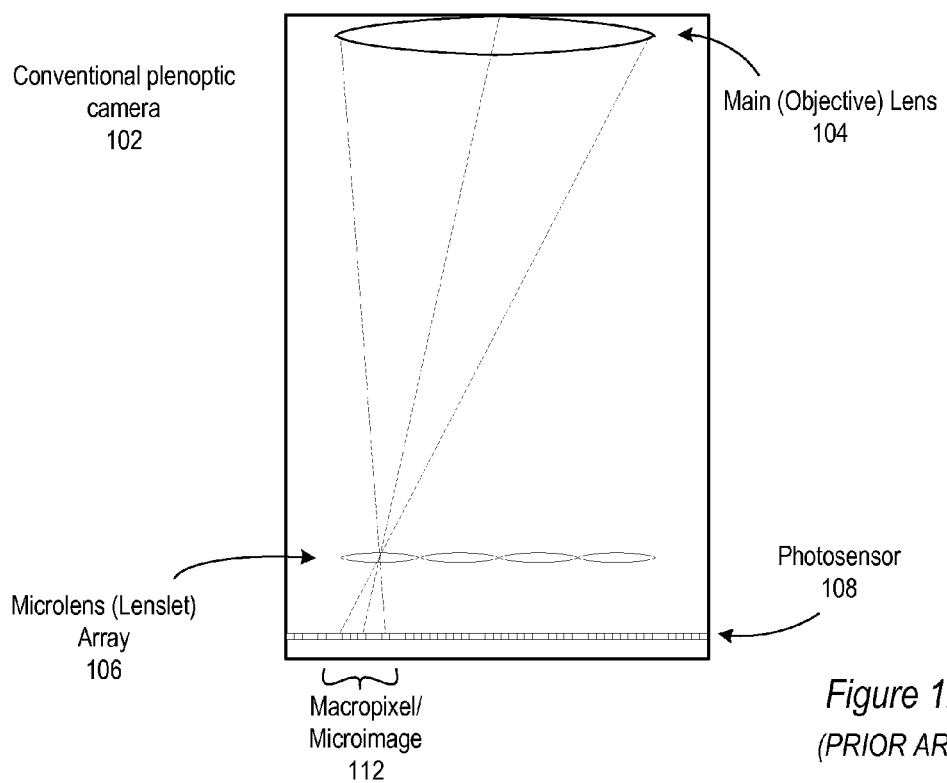
FIG. 1b illustrates an exemplary prior art plenoptic camera.

The above analysis proves that the frequency method for multiplexing radiance, described in the case of the pinhole light-field camera, is also valid for a microlens-based integral camera. Similarly, the plenoptic camera, e.g. as illustrated in FIG. 1b, and other lens-based radiance cameras that may be shown equivalent to it, can be analyzed using this formulation.

From the above analysis, radiance capture by multiplexing in the frequency domain may be applied to lens-based radiance cameras in general. It follows that a frequency domain demultiplexing method may be applied to the radiance captured by a lens-based radiance camera to demultiplex the radiance information. The angular information of radiance images captured with a lens-based radiance camera may, for example, be demultiplexed using a frequency domain demultiplexing method as illustrated in FIG. 8 to generate multiple parallax views of a scene.

Replacing the pinhole array with a mask

Radiance cameras that use a periodic sinusoidal mask (e.g., a cosine mask) instead of pinholes or microlenses between the photosensor and the main lens of the camera, and proximate to the photosensor, have been proposed. One way to analyze these mask-based radiance cameras would be to start again with the pinhole formula derived for the pinhole light-field camera, and instead of prisms assume appropriate attenuation at each pinhole. On the other hand, it is also possible to directly derive the result for periodic attenuation functions, such as:

$$\frac{1}{2}(1 + \cos(\omega_0 q))$$

The radiance after the attenuating mask may be represented as:

$$R'(\omega) = \frac{1}{2}R(\omega) + \frac{1}{2}\int r(x)\cos(\omega_0 q)e^{i\omega x}dx \quad (17)$$

$$= \frac{1}{2}R(\omega) + \frac{1}{4}\int r(x)(e^{i\omega_0 q} + e^{-i\omega_0 q})e^{i\omega x}dx$$

$$= \frac{1}{2}R(\omega) + \frac{1}{4}(R(\omega_q + \omega_0, \omega_p) + R(\omega_q - \omega_0, \omega_p))$$

After the mask, the signal travels a distance f to the sensor. Again using equations (5) and (11) the following expression for the radiance may be obtained:

$$R_f(\omega_q, \omega_p) = \frac{1}{2}R(\omega_q, f\omega_q + \omega_p) + \quad (18)$$

$$\frac{1}{4}(R(\omega_q + \omega_0, f\omega_q + \omega_p) + R(\omega_q - \omega_0, f\omega_q + \omega_p))$$

Again, duplication of the band-limited signal into multiple blocks and shearing proportional to the travel distance may be observed. It is important to note that any periodic mask, not just sinusoidal masks such as cosine masks, may be analyzed this way based on Fourier series expansion and considering individual component frequencies. Samples of the signal on the $\omega_q$ axis may be used to reconstruct the complete radiance $R(\omega)$.

Placing the Array in Front of the Camera

Another type of radiance camera may be implemented by placing any one of the optical elements or arrays (mask, microlens array, pinhole array) described as internal elements in relation to the various radiance camera designs in front of the main lens of a conventional camera instead of inside the camera between the photosensor and the main lens, and focusing the camera slightly behind the array. This external array radiance camera design is possible based on the fact that the image inside any camera is 3-dimensional, and is a distorted copy of the outside world. It is clear that the structures placed inside the camera have corresponding structures in the outside world. This is based on the mapping defined by the main camera lens.

The photosensor plane corresponds to the plane of focus, and any optical elements in front of the photosensor plane may be replaced by their enlarged copies in the real world, in front of the external plane of focus. Because of this correspondence, and based on the lens formula, optical elements may be built or placed in front of the camera and used as if they were microstructures inside the camera. Later in this document, in the section titled External mask-based radiance camera, a discussion is provided that is directed at replacing a fine mask or screen in front of the photosensor or film, in an area not accessible due to the cover glass, with a non-refractive mask, e.g. a net, mesh or screen, in front of the camera, and embodiments of an external mask-based radiance camera based on this notion are described.

Matching the F/Numbers

For lens-based radiance cameras that employ an array of microlenses inside the camera, such as the plenoptic camera illustrated in FIG. 1b, there exists a restriction that the F/numbers of the main camera lens and the microlenses should be matched. This restriction is based on the following characteristics of or observations about such cameras. If densely packed microlenses in a radiance camera had a smaller F/number than the main (objective) lens, then parts of the images of the main lens would extend beyond the area covered by the corresponding microlens, and would interfere with the images refracted by the neighboring microlens, and vice versa. If the F/number of the microlenses were bigger, then part of the area of the photosensor under each microlens would not be used. Thus, to maximize usage of the photosensor and to minimize interference, the F/number of the microlenses should match the F/number of the main or objective lens in a lens-based radiance camera.

Thus, a photographer is not free to change the aperture of the main camera lens without considering the current aperture of the microlenses in a lens-based radiance camera. Whether this restriction is relaxed in any way for other radiance cameras that are not based on microlenses, and whether there exists a quantity equivalent to F/number in cases other than microlenses, are questions that may be addressed via frequency domain analysis of radiance cameras.

The final expression for the radiance in all radiance cameras has a second (angular frequency) argument in R equal to $f\omega_q$, where f is the distance from the pinholes, microlenses or mask to the photosensor. This is a measure for the amount of shear, which can be seen as the tilt of the line $f\omega_q$ in FIG. 4b. Assume a radiance camera is sampling the angular frequency N times, i.e., copies of the signal that intersect with the $\omega_q$ axis N times. For example, this could be a mask containing N frequencies at interval $\omega_0$, or N peaks, including the zero frequency peak. The frequency spectrum of this signal covers an interval of $N\omega_0$ in the horizontal axis. Because of the tilt, those peaks are spread in the vertical $\omega_p$ axis in an interval of $N\omega_0$. Therefore, the following expression holds:

$$2\omega_{p0} = fN\omega_0 \tag{19}$$

where $\omega p_0$ is the maximal angular frequency of the original signal. The width of the cone of rays (maximal angle of rays) coming to a point on the film plane in a camera is $$\frac{1}{F},$$

where F is the F/number of the main lens. If the maximal resolution (number of lines) in a radiance camera in an angular direction is N, then the maximal angular frequency would be $\omega_{p0} = 2\pi NF$. By substituting in equation (19), the following equation may be obtained:

$$f\omega_0 = 4\pi F \tag{20}$$

Since the wavelength is b, so that $$\omega_0 = \frac{2\pi}{b},$$

the following equation may be obtained:

$$f\frac{2\pi}{b} = 4\pi F \tag{21}$$

The maximal spatial frequency in the initial band-limited spectrum is $$\frac{\omega_0}{2},$$

and the signal has wavelength 2b. In this way, the following equation may be obtained:

$$\frac{f}{b} = F \tag{22}$$

Thus, all radiance cameras multiplexing in the frequency domain should satisfy the F/number matching condition of equation (22), where F is the F/number of the objective lens, b is the pitch of the pinholes or microlenses, or the period of the lowest frequency in the mask, and f is the distance from the outer surface of the mask or array of pinholes or microlenses (the surface closest to the objective lens) to the sensor for internal mask, pinhole array, and microlens radiance cameras. For external equivalents to internal radiance cameras, such as the external mask-based camera 300 illustrated in FIG. 19, f is the distance from the external mask to the plane at which the main lens is focused behind the mask.

Demultiplexing in the Frequency Domain

The method of frequency domain analysis has been applied in the sections above to the images captured by the various radiance camera designs. In this section, methods of demultiplexing in the frequency domain to render images from radiance captured by the different radiance camera designs is described, and examples from each of the various radiance camera designs are shown.

Methods of Demultiplexing

In all of the aforementioned radiance camera designs, the 4-dimensional radiance is multiplexed onto the 2-dimensional camera sensor or film. This process of radiance multiplexing is given by equations (14), (16) and (18) for the respective camera designs. It is noted that the entire 4-D light field is encoded in a radiance image captured with a radiance camera.

FIGS. 5a, 6a, and 7a illustrate exemplary images obtained from the three aforementioned radiance camera designs. FIG. 5a illustrates an exemplary image obtained from a lens-based radiance, or integral, camera. FIG. 6a illustrates an exemplary image obtained from a mask-based radiance camera in which the mask is located internal to the camera between the photosensor and the main lens. FIG. 7a illustrates an exemplary image obtained from an external mask-based radiance camera, such as camera 300 of FIG. 19, in which a net or mesh is placed in front of the main lens of a conventional camera. FIGS. 5b, 6b, and 7b illustrate a zoom-in of a region of the images illustrated in FIGS. 5a, 6a, and 7a, respectively, and show more detail. FIGS. 5c, 6c, and 7c illustrate the magnitudes of the 2-D Fourier transforms of the images illustrated in FIGS. 5a, 6a, and 7a, respectively. The shifted slices or tiles of the transform are visible in each of the images shown in FIGS. 5c, 6c, and 7c. Notice that these slices or tiles are placed at equal distances both horizontally and vertically in the case of the lens-based radiance camera image of FIGS. 5a-5c and external mask-based radiance camera image of FIGS. 7a-7c, and only horizontally in the case of the mask-based radiance camera images of FIGS. 6a-6c. This is due to the use of a mask consisting of only vertical lines in the mask-based radiance camera (see FIG. 6b). In all three cases, examples will be shown of extracting horizontal parallax, but it is noted that extending the method to obtain parallax in both directions is straightforward.

There exist several conventional techniques that may be used to extract individual parallax views from a radiance image. Frequency domain multiplexing techniques have been described for radiance images captured with conventional mask-based radiance cameras that specifically use cosine masks, and a frequency domain demultiplexing method may be applied to these radiance images. In the case of lens-based radiance cameras, spatial multiplexing techniques as opposed to frequency domain multiplexing techniques are conventionally used. In an exemplary spatial multiplexing technique, pixels belonging to each "little camera" of a radiance camera (e.g., to each microlens in a microlens array) may be extracted from the captured image, rearranged and put into individual images, so that a 2-D array of 2-D images is obtained. However, the frequency domain analysis of various radiance cameras provided above has shown that frequency domain multiplexing can be applied to lens-based radiance cameras and to pinhole light-field cameras in addition to mask-based radiance cameras, to external mask-based radiance cameras, and to mask-based cameras with masks that are not necessarily sinusoidal masks. It follows that a frequency domain demultiplexing method, such as the one described below, may be applied to radiance images captured with other types of radiance cameras than conventional cosine mask-based radiance cameras.

FIG. 8 illustrates a method of demultiplexing the angular information of a radiance image captured using a radiance camera, according to one embodiment. The Figure shows an exemplary application of a frequency domain demultiplexing method to the radiance image illustrated in FIG. 6a, which was captured using an internal mask-based radiance camera, but it is noted that the same or a similar method may be applied to radiance images captured with the other types of radiance cameras, including but not limited to lens-based radiance cameras and external mask-based radiance cameras.

The frequency domain demultiplexing method illustrated in FIG. 8 may be based on the separability of the Fourier transform 200 of the original captured radiance image. Depending on the configuration of the optical elements in the radiance camera (whether lens-based or mask-based), three or four dimensions may be multiplexed in the radiance, with two spatial and one or two angular dimensions. For example, a radiance image captured using a mask 302C of FIG. 17 may include only one angular dimension, while a radiance image captured with a mask 302A of FIG. 17 may include two angular dimensions. With reference to FIGS. 4a through 4d, the slices or tiles 204 of the 2-D Fourier transform 200 may be extracted, as indicated at 202. As indicated at 206, a 2-D inverse Fourier transform (IFFT) is individually applied to each of the slices to obtain intermediate images 208. As indicated at 210, the intermediate images 208 are stacked together to form a 3-D image or a 4-D image 212, depending on the number of angular dimensions in the radiance. Final horizontal parallax images 216 may be obtained by applying a 1-D or 2-D inverse Fourier transform (IFFT) along the angular dimension of the 3-D image or along the two angular dimensions of the 4-D image and unstacking the results, as indicated at 214. This process is effectively performing a 3-D IFFT. In the general case of horizontal and vertical parallax, the process is extended to 4-D IFFT. Again, FIG. 8 is directed at extracting horizontal parallax, but it is noted that extending the method to obtain parallax in both horizontal and vertical directions is straightforward. In one embodiment, an extension of the method to extract vertical parallax may apply the same or similar elements 202, 206, 210 and 214 on the vertical axis of the Fourier transform, e.g. the images shown in FIGS. 5c and 7c, of the radiance image.

FIGS. 9a and 9b illustrate a method of correcting the effect of waves due to small shifts or misalignments in the FFT, according to one embodiment. Good artifact-free results are very sensitive to determining the location of the centers of the slices or tiles in the Fourier transforms. The Fourier transforms of the images may be obtained by Fast Fourier Transform, which makes the location of the centers of the slices ambiguous due to the discretization. There may be a misplacement error within one pixel around each center, which may cause low-frequency waves in the final parallax images. In one embodiment, this problem may be addressed by multiplying the images before the last 1-D IFFT by a linear phase that corresponds to the subpixel shift in the FFT to more correctly determine the centers of the slices. FIG. 9a shows an image from a mask-based radiance camera before the phase correction is applied to eliminate the low-frequency waves, and FIG. 9b shows the image after the phase correction is applied to eliminate the low-frequency waves.

Figure 22:
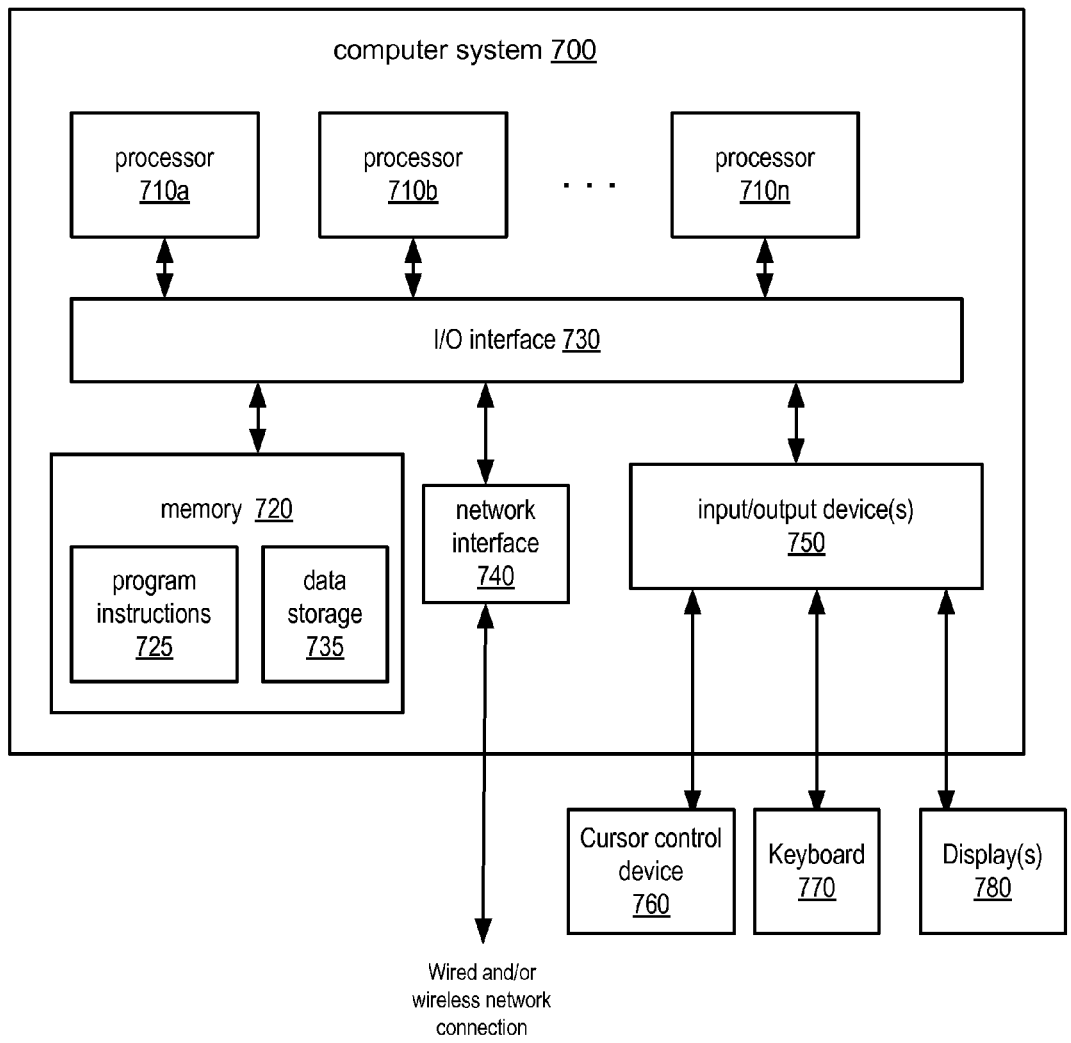
FIG. 22 illustrates an exemplary computer system that may be used in embodiments.

Embodiments of the frequency domain demultiplexing method described above may be implemented in software as or in one or more frequency domain demultiplexing modules. The module(s) may, for example, be implemented in a radiance image processing application or library. FIG. 22 illustrates an exemplary computer system in which embodiments of the frequency domain demultiplexing module may be implemented.

FIG. 10 illustrates a frequency domain demultiplexing module, according to one embodiment. Radiance image 410 may be captured with any of a variety of radiance cameras, including but not limited to various lens-based radiance cameras, internal mask-based radiance cameras, external mask-based radiance cameras, internal and external mask-based radiance cameras that use periodic masks that are not necessarily sinusoidal (e.g., cosine) masks, radiance cameras that use an internal or external net, screen or mesh as a mask rather than a conventional mask, and pinhole light-field cameras. Frequency domain demultiplexing module 400 obtains or receives an input radiance image 410. Frequency domain demultiplexing module 400 performs a frequency domain demultiplexing method, for example as described in FIG. 8, on the input image 410 to generate multiple output images 440, for example multiple parallax views of a scene for which the radiance information was captured in radiance image 410. In one embodiment, during the method, the method of correcting the effect of waves due to small shifts or misalignments in the FFT, as described above in reference to FIGS. 9a and 9b, may be applied. Output images 440 may, for example, be stored to a storage medium 450, such as system memory, a disk drive, DVD, CD, etc.

In one embodiment, frequency domain demultiplexing module 400 may provide a user interface that provides one or more textual and/or graphical user interface elements, modes or techniques via which a user may view or control various aspects of frequency domain demultiplexing. For example, the user interface may include user interface elements that allow a user to select input and output files, to specify optical characteristics of the radiance camera used to capture the input radiance image, and so on.

Radiance Camera Embodiments

Embodiments of the frequency domain demultiplexing method of FIG. 8 may be applied to radiance images captured with various types of radiance cameras, including but not limited to lens-based radiance cameras and mask-based radiance cameras. Several embodiments of different types of radiance cameras are described below.

Lens-based Radiance Cameras

Figure 11A:
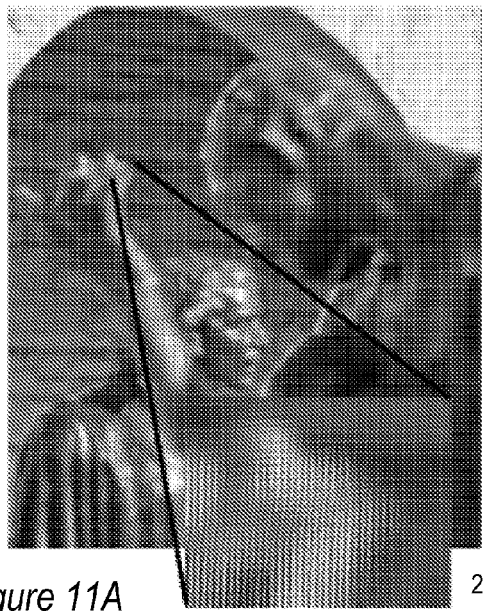
FIG. 11a shows an exemplary radiance image captured with a lens-based radiance camera.
Figure 11B:
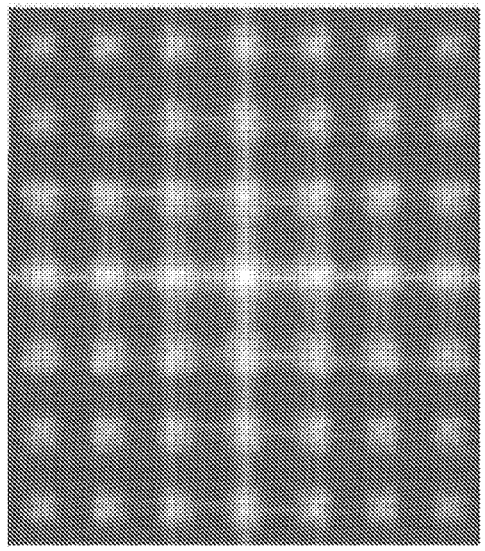
Figure 12A:
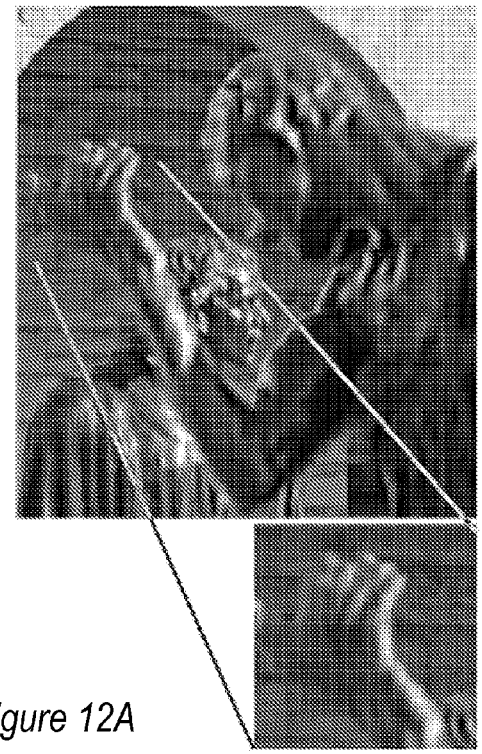
FIGS. 12a and 12b show two stereo views from the frequency domain reconstructed light field of FIGS. 11a and 11b.
Figure 12B:

Embodiments of the frequency domain demultiplexing method of FIG. 8 may be applied to radiance images captured with lens-based radiance cameras, for example radiance images captured with a plenoptic camera such as plenoptic camera 102 illustrated in FIG. 1b. To illustrate the frequency domain demultiplexing method of FIG. 8 for a lens-based camera, a simulation of the plenoptic/integral camera may be accomplished by taking multiple images of a scene with one conventional lens camera. For example, as a simulation of the plenoptic/integral camera, 49 images of a scene may be taken from equally spaced locations. The centers of projection may be arranged on a plane as a 7×7 grid, with the cameras pointed perpendicular to the plane. The final image is made up of 7-pixel×7-pixel blocks, each of which consists of 49 pixels taken from the same location in all 49 images. FIG. 11a shows an exemplary radiance image taken using the above apparatus. Zoomed area 250 shows the formed blocks. FIG. 11b shows the absolute value of the Fourier transform of the radiance image of FIG. 11a. To obtain horizontal parallax, the frequency domain demultiplexing method of FIG. 8 may be applied, with 7 views. Two images resulting from this process are shown in FIGS. 12a and 12b, which show two stereo views from the frequency domain reconstructed light field of FIGS. 11a and 11b. Small parallax is visible in this stereo pair at close examination. Note that the left and right images are switched. The left and right images are switched so that stereo fusion can be achieved with crossed eyes observation. Note that the embodiments of lens-based radiance cameras described herein are exemplary, and not intended to be limiting. Other embodiments of lens-based radiance cameras, using various types of film-based or digital camera designs, are possible and contemplated.

Mask-based Radiance Camera Implementations

Embodiments of the frequency domain demultiplexing method of FIG. 8 may be applied to radiance images captured with non-refractive mask-based radiance cameras. Various different mask-based radiance camera designs are described that may be used to illustrate the frequency domain demultiplexing method of FIG. 8 for images captured with a mask-based radiance camera. In order to achieve good resolution, a small value of the largest period b, on the order of 0.1 mm, may be used. With F/number of the main lens equal to 4, the mask may be placed about 0.4 mm from the surface of the sensor, which may not be possible due to the cover glass. Because of the cover glass restriction, embodiments of a mask-based radiance camera based on a film-based, medium format camera may be used. Reasons for using a medium format camera may include the larger image that gives potential for higher resolution and easier access to the film back, where modifications may be made to convert the conventional camera into a mask-based radiance camera. The embodiments of mask-based radiance cameras described herein are exemplary, and not intended to be limiting. Other embodiments using other types of film-based or digital camera designs and/or other types of masks are possible and contemplated.

Figure 13:
FIG. 13 shows a conventional medium-format film camera and a film back, with a computer screen filter, used as a mask, attached to the window just in front of the film, according to one embodiment.
Figure 17:
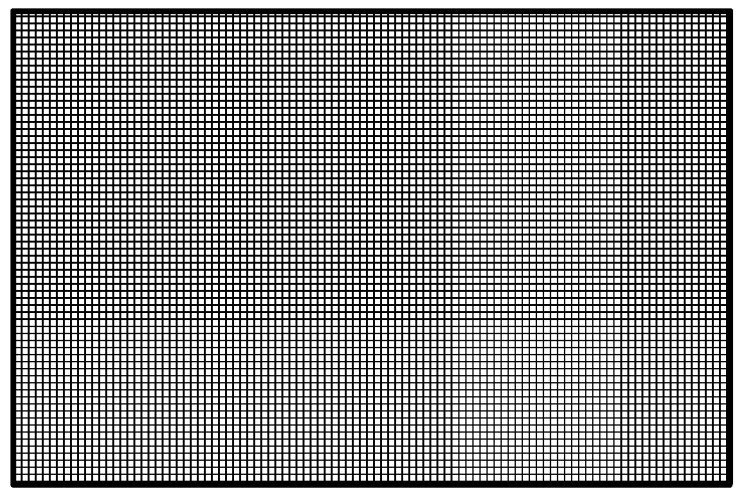
FIG. 17 illustrates exemplary net- or mesh-like, non-refractive masks, according to embodiments.
Figure 17:
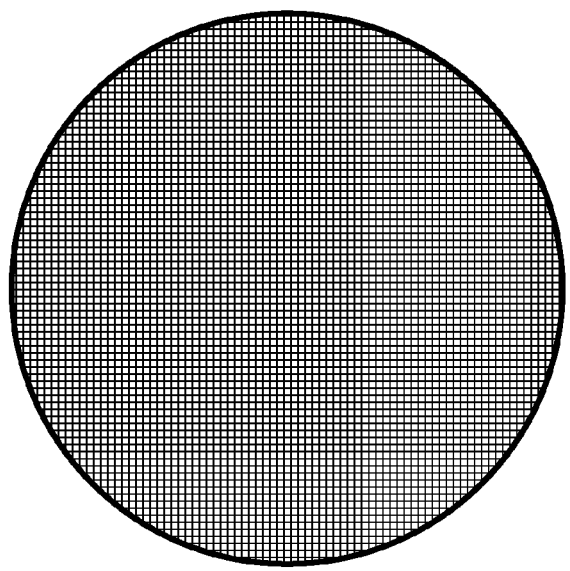
Figure 17:
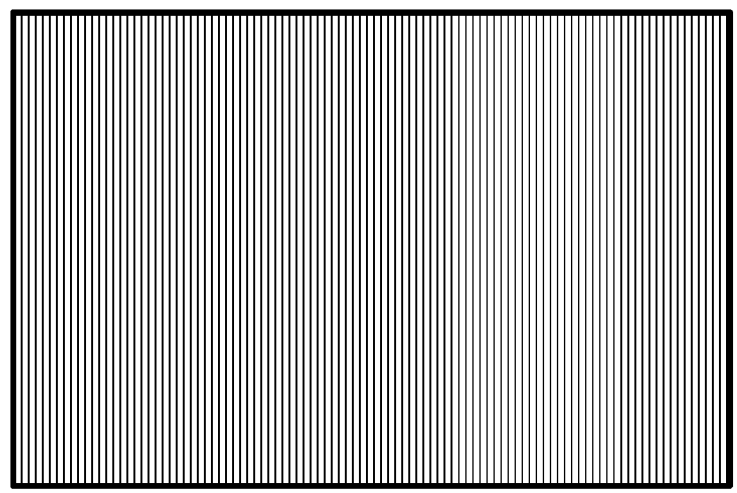

In an exemplary embodiment of a mask-based radiance camera, a Contax™ 645 medium format film camera with a film back may be used (see FIG. 13). Note that various other film cameras with film backs could be substituted for the Contax™ camera. Exemplary embodiments that use different mesh, net or screen masks are described. Refer to FIG. 17 for exemplary net- or mesh-like non-refractive masks.

In a first exemplary embodiment, a picture of a poster displaying a computer-generated grid is taken, and then the negative is used as a mask in front of the film in the film back. In one embodiment, the computer-generated grid is a 2-D cosine mask with 3 harmonics in both spatial dimensions. The spacing of 0.5 mm may be achieved by placing the developed negative between two thin glasses to form a non-refractive mask. The film that is being exposed slides directly on the surface of the glass.

In a second exemplary embodiment, a computer screen filter, e.g. a 3M™ computer screen filter, may be used as a non-refractive mask in front of the film in the film back. In one embodiment, the computer screen filter contains about 14 black lines per mm, and the lines are sandwiched between transparent plastic material 0.2 mm thick. As a result, the F/number of the mask is approximately 3. FIG. 13 shows a Contax™ 645 camera, and the film back with a 3M™ computer screen filter attached to the window just in front of the film, according to one embodiment. Using this embodiment, a high-resolution radiance image of 14 samples/mm may be captured, where each sample contains complete angular information.

Results obtained with the second exemplary embodiment of a non-refractive screen mask are shown herein, but note that the results from the first exemplary embodiment of a non-refractive screen mask are similar.

A sequence of parallax movies, which are generated from pictures captured by the above exemplary internal mask-based radiance camera at different apertures, may be used to illustrate that the optimal F/number exemplary mask-based radiance camera is approximately 5.6. This value is slightly higher than the expected 3 or 4. Possible reasons are the refractive index of the plastic material, which increases optical path, and possible micro-spacing between the film and the 3M™ filter due to mechanical imperfection/dust.

Figure 14:
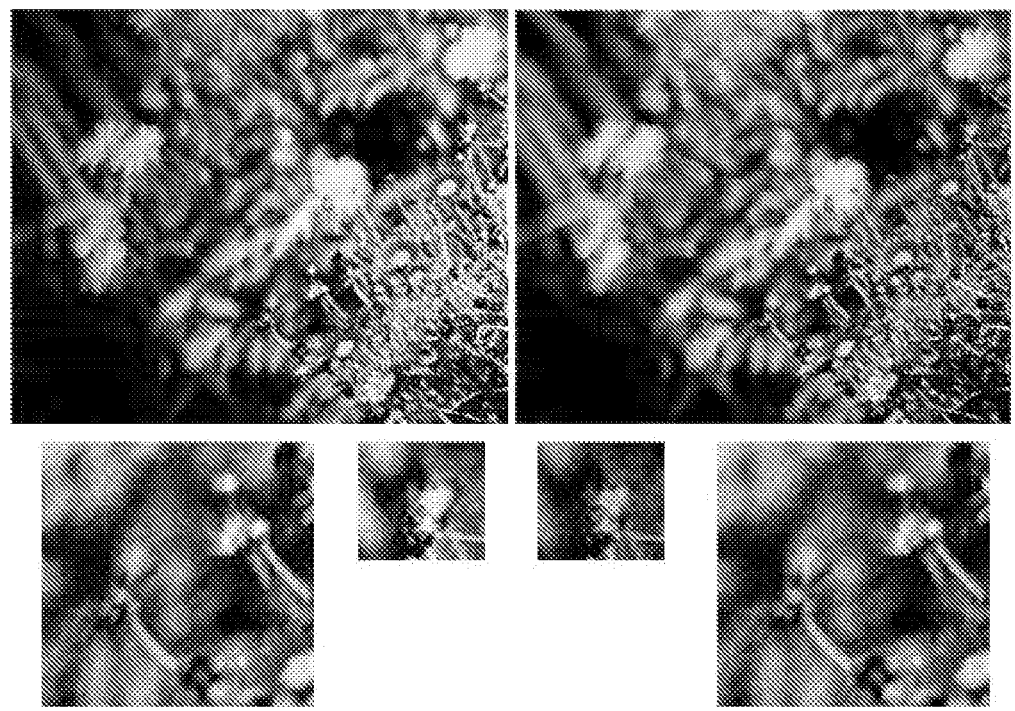
FIG. 14 shows two stereo views generated from a radiance image taken using an exemplary mask-based radiance camera.

FIG. 14 shows two stereo views generated, using a frequency domain multiplexing method as illustrated in FIG. 8, from a radiance image taken using the exemplary mask-based radiance camera with the mask at F/5.6. Selected areas show detail in which it is easy to spot parallax. Note that, as in FIGS. 12a and 12b, the left and right images are switched.

External Mask-based Radiance Cameras

In the section titled Placing the array in front of the camera, it was demonstrated that a non-refractive mask or screen in front of the photosensor or film may be replaced with a non-refractive mask, e.g. a net or screen, array or grid of pinholes, etc., in front of the main camera lens. To demonstrate the method of frequency domain multiplexing for a radiance camera based on such an external mask, pictures may be taken with a conventional camera through a net, mesh, or screen in front of the camera (see mask 302A of FIG. 16 to view what such a net, mesh or screen may look like). For the demonstration, a conventional camera with an 80 mm lens and a digital back, without any modifications to the camera, may be used. For the demonstration, the mesh is placed approximately 2 meters (m) from the camera, and the camera is focused on a plane about 10 centimeters (cm) behind the net or mesh. With this apparatus, the cover glass problem of the mask-based radiance cameras described above may be overcome. Note that the above-described apparatus is exemplary, and not intended to be limiting. Embodiments of an external mask-based radiance camera 300 that employs similar principles demonstrated via the above exemplary apparatus are illustrated in and described in reference to FIG. 19.

By differentiating the lens equation:

$$\frac{1}{a} + \frac{1}{b} = \frac{1}{f}$$

the following is obtained:

$$\frac{da}{a^2} = -\frac{db}{b^2}$$

Therefore, moving the focus by da=10 cm away from the net or mesh produces a movement of:

$$-da\frac{b^2}{a^2} = 0.16\,\text{mm}$$

away from the photosensor surface. At the same time, the image of the 2 mm grid of the net or mesh has been reduced linearly to 0.08 mm, which gives an F/number of about 3, and high resolution.

Figure 15:
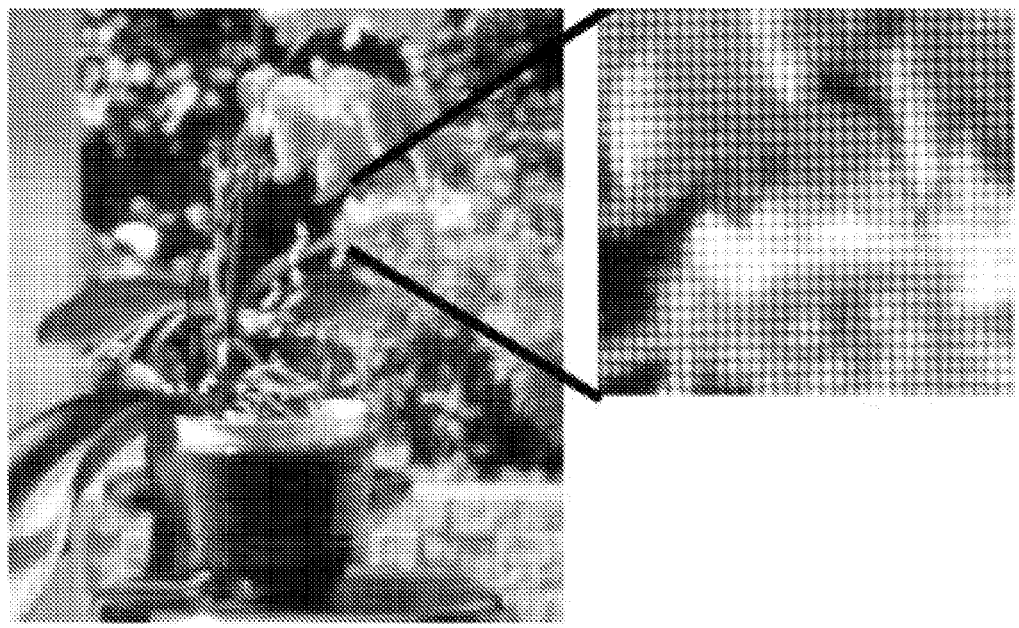
FIG. 15 shows a picture taken through a net, or mesh, located in front of a conventional camera.
Figure 16:
FIG. 16 shows two stereo views from the radiance generated from the picture shown in FIG. 15.

FIG. 15 shows a picture taken through a net, or mesh, using the apparatus described above. The Figure shows an image taken through a mesh with a conventional camera at F/number 4. FIG. 16 shows two stereo views from the radiance generated from the picture shown in FIG. 15. The left and right images are switched. The two stereo views of the scene may be reconstructed using a method of demultiplexing in the frequency domain as illustrated in FIG. 8.

Figure 18:
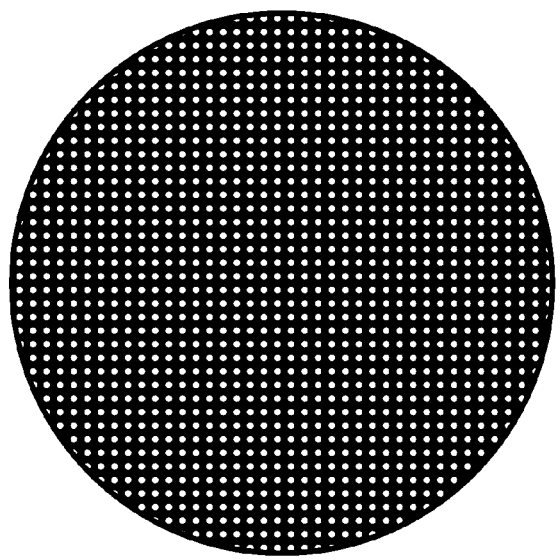
FIG. 18 illustrates other exemplary non-refractive masks, according to embodiments.
Figure 18:
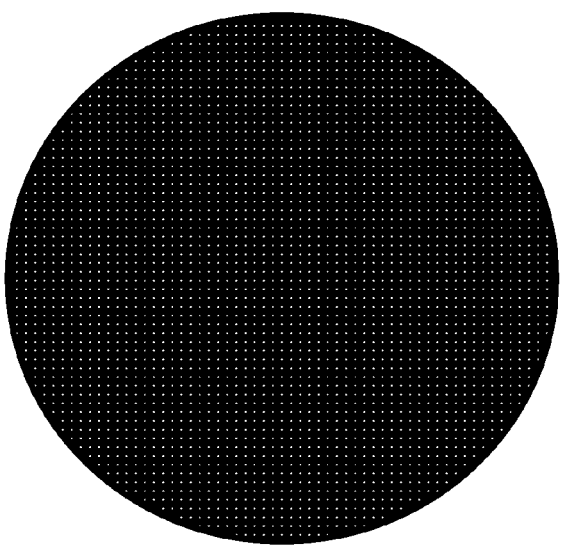
Figure 18:
Figure 19:
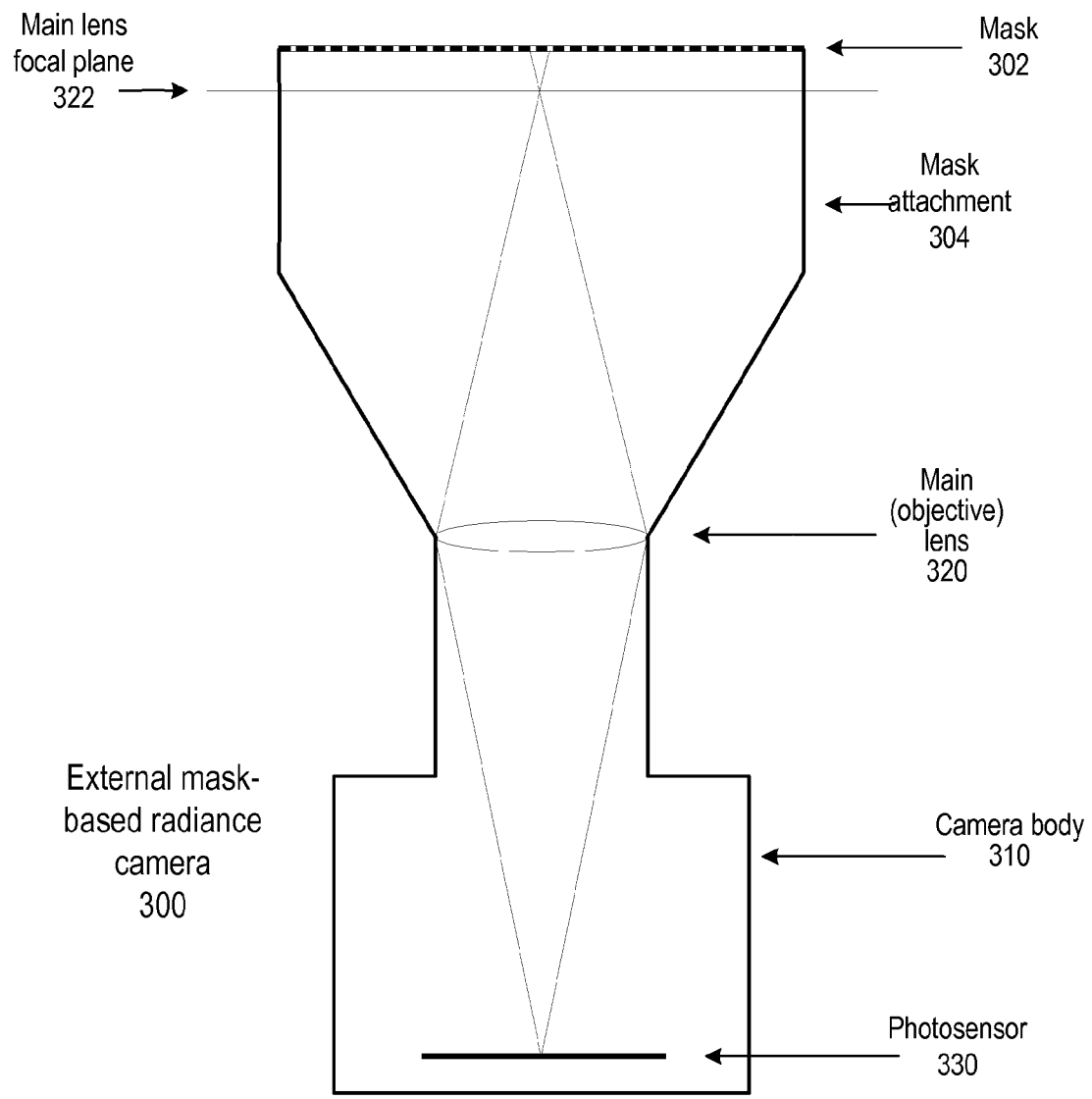
FIG. 19 illustrates an exemplary radiance camera with an external mask attachment, according to one embodiment.

FIGS. 17 and 18 illustrate exemplary non-refractive masks, according to embodiments. With appropriate physical adaptations for mounting or otherwise attaching the masks in or to the cameras, the exemplary masks may, be used as internal masks, e.g. placed in front of the photosensor, for example in a film-back camera as previously described, or as external masks placed in front of the main camera lens, for example in an external mask-based radiance camera as illustrated in FIG. 19. The masks are non-refractive; that is, while the masks may act to modulate and/or attenuate the light, the masks do not act to bend the light rays. It is important to note that the exemplary non-refractive masks are not limited to sinusoidal (e.g., cosine or sine) masks. In other words, any periodic mask may be used in mask-based radiance cameras as described herein.

FIG. 17 shows examples of net- or mesh-like, non-refractive masks. Mask 302A illustrates a rectangular mesh-like mask. Mask 302B illustrates a circular mesh-like mask 302B. A mesh, which also may be referred to as a net or screen, may include horizontally and vertically arranged opaque linear elements or grid lines, which collectively form a grid that modulates, but does not refract, light as the light passes through the grid. Generally, the opaque grid lines may be equally spaced in the two dimensions. Thus, the opaque grid lines act to form or define rows and columns of periodically spaced transparent (i.e., through which light may pass), non-refractive openings. In this example, the openings are square; however, in some embodiments, the openings may be rectangular but not square. In some embodiments, a mesh mask may include only horizontal or vertical lines, as illustrated in mask 302C.

FIG. 18 shows examples of some other types of non-refractive masks 302 that, like the masks illustrated in FIG. 17, may be used as internal or external masks. Mask 302D illustrates an exemplary circular mask that includes transparent circular openings, through which light may pass, in an opaque medium or surface. The circular openings in this example are periodically spaced, and arranged in horizontal rows and vertical columns. Other geometric shapes than circles may be used for the openings in other embodiments, e.g. squares, hexagons, rectangles, etc. Mask 302E illustrates an exemplary circular mask that is composed of a grid of pinholes in an opaque medium or surface. The pinholes, which may also be referred to as openings, may typically be, but are not necessarily, circular. Like the circular openings of mask 302D, the pinholes in this example are periodically spaced, and arranged in horizontal rows and vertical columns. Note that the pinhole mask 302E appears similar to mask 302D. However, the use of the term "pinhole" indicates that the size of the openings is very small, as in the optical notion of a "pinhole camera"; very small openings, or pinholes, have optical effects that are not produced, or not produced to the same degree, by larger openings. In other words, a mask with very small openings may be referred to as a pinhole mask, while a mask with larger openings, such as mask 302D, is not technically a pinhole mask. Mask 302F illustrates another pinhole mask, this one rectangular instead of circular, and in which the pinholes are aligned differently than the pinholes in mask 302E.

In various embodiments, the opaque grid lines of the masks 302 illustrated in FIG. 17, or the opaque surface or medium through which there are openings of the masks 302 illustrated in FIG. 18, may be composed of a metal, a paint, an alloy, a plastic, a composite material, or any other suitable opaque substance, composition or material capable of being arranged, affixed or applied to form the linear, opaque elements of a grid, or an opaque surface through which openings may be provided, for use in an optical device. In some embodiments, the grid or surface with openings may be affixed to, painted on, or otherwise attached to a surface of a non-refracting, transparent sheet of glass. In other embodiments, the grid or surface with openings may be sandwiched between two non-refracting, transparent sheets of glass. Other non-refracting, transparent materials than glass may be used. One skilled in the art will recognize that other materials and methods of manufacturing such masks are possible.

Note that the openings in masks 302, including but not limited to the exemplary masks illustrated in FIGS. 17 and 18, may be variably spaced without restriction on the spacing other than periodicity. That is, while the openings are arranged periodically, the distribution of the openings in the masks 302 is not limited to, for example, the cosine, or integer multiples of the cosine. In other words, while sinusoidal masks such as cosine masks may be used in embodiments, periodic masks other than sinusoidal masks may also be used in embodiments.

In some embodiments of an external mask-based camera such as camera 300 of FIG. 19, a mask 302 may be integrated with, or alternatively may be coupled to and decoupled from, an attachment, e.g. a tube. The attachment, in turn, may be coupled to and decoupled from a camera body. Alternatively, the mask 302 may be integrated with the attachment. As yet another alternative, the mask 302 may be integrated with the camera body, in front of the main or objective lens of the camera. In one embodiment, the mask 302, when integrated with or coupled to a camera, is positioned so that the horizontal and vertical grid lines, or rows and columns of openings, are horizontal and vertical with respect to the camera, i.e. the photosensor, so that the horizontal grid lines (or rows of openings) are parallel to the horizontal axis of the photosensor, and the vertical grid lines (or columns of openings) are parallel to the vertical axis of the photosensor.

The exemplary masks of FIGS. 17 and 18 are not intended to be limiting; other geometric shapes may be used for masks 302, the number, thickness and spacing of the opaque elements or grid lines in mesh-like masks such as masks 302A, 302B, and 302C may vary, and as mentioned above, the size, shape, and spacing of the openings in other types of masks such as masks 302D, 302E and 302F may vary.

Embodiments of a radiance camera based on an external, non-refractive mask located in front of the main or objective camera lens, rather than between the main lens and the photosensor or film, are described. FIG. 19 illustrates an exemplary radiance camera with an external mask, according to one embodiment. External mask radiance camera 300 may include a camera body 310. Various types of cameras may be used in some embodiments, including both film-based and digital cameras, and standard, medium or large-format cameras. Thus, photosensor 330 may be conventional film or a device for digitally capturing light, for example a CCD, and photosensor 330 may be integrated into camera body 310 or mounted to camera body 310 via a film back such as in the camera shown in FIG. 13. Main (objective) lens 320 may be any of a variety of types of lenses, including lenses with different focal lengths or other optical characteristics, and may be integrated into camera body 310 or mounted to camera body 310 via an external lens attachment.

A non-refractive mask 302, such as exemplary mesh-like masks 302A through 302C illustrated in FIG. 17, or exemplary masks 302D through 302F illustrated in FIG. 18, may be integrated with camera body 310 in front of the main lens 320, or alternatively attachable to camera body 310 or to an external attachment 304, with mask 302 positioned in front of the main lens 320 so that light from a scene to be photographed arrives at the main lens 320 after passing through the mask 302. The mask 302 is a non-refractive element, and as such modulates and/or attenuates the incoming light rays but does not bend them. The mask 302 is not limited to sinusoidal masks such as cosine masks or sine masks; any arbitrary periodic mask may be used. In one embodiment, the mask 302 may be mounted in or integrated with a mask attachment 304. Mask attachment 304 may be integrated with camera body 310, or alternatively may be coupled to and decoupled from camera body 310 in front of main lens 320. Note that the illustrated shape and size, including the length, of mask attachment 304 is exemplary, and not intended to be limiting. Furthermore, the sizes and spacing of the mask 302, mask attachment 304, main lens 320, camera body 310, and photosensor 330 are exemplary and not intended to be limiting. In other words, external mask-based radiance camera 300 is not necessarily drawn to scale.

In one embodiment, the main lens 320 may be focused on a plane 322 just behind the mask 302, between the mask 302 and the main lens 320. Light from plane 322 is refracted by main lens 320 onto photosensor 330, which may in turn operate to capture a radiance image of the scene, e.g. when a shutter of the camera 300 is triggered. An exemplary radiance image captured with a mask (in this example, a net- or mesh-like mask) located in front of the main camera lens is shown in FIG. 15.

The angular information of radiance images captured with embodiments of external mask radiance camera 300 may be demultiplexed using an embodiment of the frequency domain demultiplexing method described in FIG. 8 to generate multiple views of a scene. The frequency domain demultiplexing method may be implemented in an embodiment of a frequency domain demultiplexing module as illustrated in FIG. 10.

In general, embodiments of an external mask radiance camera 300 as described herein may include, in addition to the above-described elements, any other type of elements and features commonly found in digital cameras or other cameras including but not limited to conventional light-field and plenoptic cameras and medium- or large-format film cameras, and may also include additional elements and features not generally found in conventional cameras. Camera 300 may include a shutter, which may be located in front of or behind objective lens 320. Camera 300 may include one or more processors, a power supply or power source, such as one or more replaceable or rechargeable batteries. Camera 300 may include a memory storage device or system for storing captured images or other information such as software. In one embodiment, the memory system may be or may include a removable/swappable storage device such as a memory stick. Camera 300 may include a screen (e.g., an LCD screen) for viewing scenes in front of the camera prior to capture and/or for viewing previously captured and/or rendered images. The screen may also be used to display one or more menus or other information to the user. Camera 300 may include one or more I/O interfaces, such as FireWire or Universal Serial Bus (USB) interfaces, for transferring information, e.g. captured images, software updates, and so on, to and from external devices such as computer systems or even other cameras. Camera 300 may include a shutter release that is activated to capture a radiance image of a subject or scene. Camera 300 may include one or more manual and/or automatic controls, for example controls for controlling optical aspects of the camera such as shutter speed, aperture, and the location of focal plane 322 of the main lens 330, one or more controls for viewing and otherwise managing and manipulating captured images stored in a memory on the camera, etc.

Figure 20:
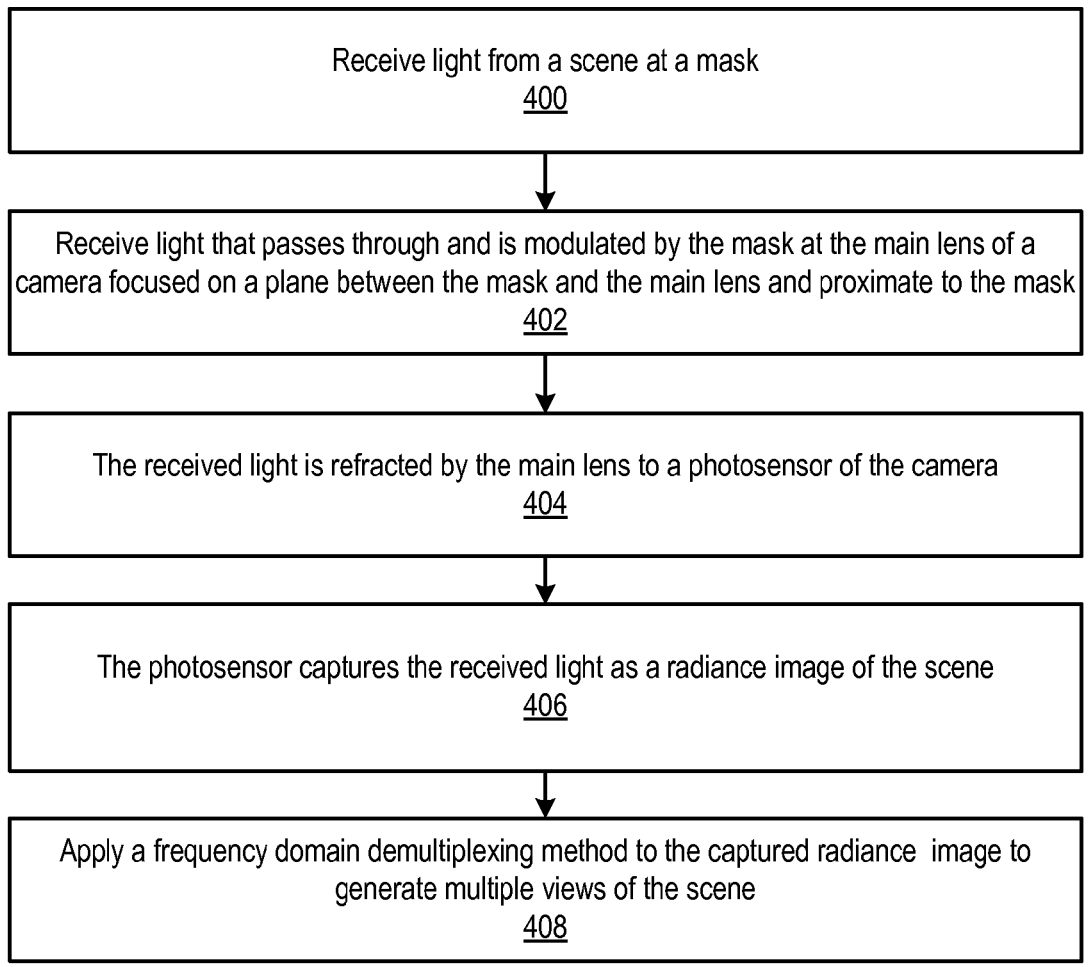
FIG. 20 illustrates a method of capturing a radiance image with an external mask-based radiance camera, according to one embodiment.

FIG. 20 illustrates a method of capturing a radiance image with an external mask-based radiance camera, according to one embodiment. The external mask-based radiance camera multiplexes radiance in the frequency domain by optically mixing different spatial and angular frequency components of the light received from a scene, and captures the radiance information at a photosensor. As illustrated at 400, light from a scene may be received at a mask 302. The mask 302 is a non-refractive element, and modulates and/or attenuates the incoming light rays but does not bend them. Light that passes through the mask 302 is received at the main lens 320 of a camera 300, as indicated at 402. The main lens 320 may be focused on a plane 322 between the mask 302 and the main lens 320, with the plane 322 proximate to the mask 302. The received light may be refracted by the main lens 320 to a photosensor 330 of the camera 300, as indicated at 404. The photosensor 330 may capture the received light as a radiance image of the scene, as indicated at 406. As indicated at 408, the angular information in the captured radiance image may be demultiplexed using an embodiment of the frequency domain demultiplexing method described in FIG. 8 to generate multiple views of the scene. The frequency domain demultiplexing method may be implemented in an embodiment of a frequency domain demultiplexing module as illustrated in FIG. 10.

In some embodiments, the captured radiance image and/or the multiple views generated by the frequency domain demultiplexing method may be stored to a memory medium or memory device. Note that, if the radiance image was originally captured to film, i.e. if the camera is a film camera, the radiance image may be digitized from the film or from a photograph produced from the film, for example using a film negative or photograph scanner, to generate a digital version of the radiance image that may be stored to a memory medium and/or processed by the frequency domain demultiplexing method of FIG. 8.

Figure 21:
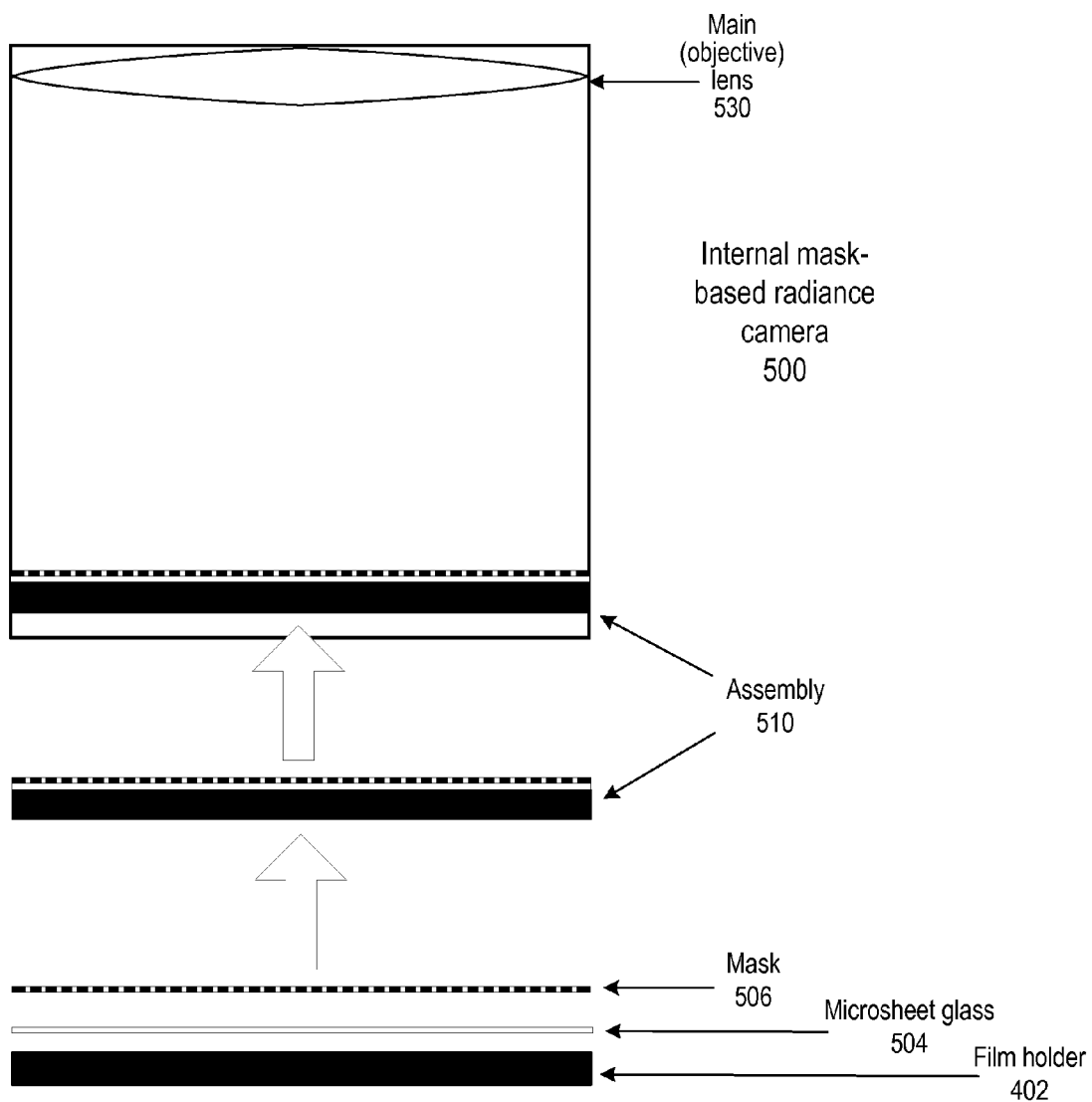
FIG. 21 illustrates an exemplary embodiment of an internal mask-based radiance camera based on a medium- or large-format film camera with a film back.

FIG. 21 illustrates an exemplary embodiment of an internal mask-based radiance camera based on a medium- or large-format film camera with a film back. In conjunction with current high-resolution scanners used to digitize captured images from negatives or prints, large-format film camera embodiments may be capable of up to 1 gigapixel, or even higher, resolution for the flat or light-field representation of the 4D radiance (the raw radiance image). FIG. 13 shows an exemplary embodiment of a conventional medium-format film camera and a film back, with a computer screen filter, used as a mask, attached to the window just in front of the film. Another exemplary embodiment may, for example, be implemented in large-format film camera using a 135 mm objective lens 530 and 4×5 format film as the "photosensor" (in medium- and large-format cameras, single negatives of film are generally placed in a film holder 502 or cartridge that can be inserted into and removed from the camera body). Other objective lenses and/or other medium or large film formats, for example 8×10 format film, may be used in various embodiments.

Radiance camera 500 includes a mask 406. Mask 406 is a non-refractive optical element, and as such modulates and/or attenuates light rays but does not bend them. Mask 506 may be a mesh-like mask such as exemplary mesh-like masks 302A through 302C illustrated in FIG. 17, or another type of mask such as exemplary masks 302D through 302F illustrated in FIG. 18. Note, however, that the mask 506 will generally be rectangular, and sized to match the format of the film camera. The mask 506 is not limited to sinusoidal masks such as cosine masks or sine masks; any arbitrary periodic mask may be used.

In one embodiment, a mechanism inside a film holder 502 of the large-format film camera holds the mask 506 so that the flat side of the glass base of the mask 506 is pressed against the film and the opaque surface of the mask 506 (the surface of mask 506 on which the opaque surface or medium is painted, attached, etc., with openings that are the transparent portion of the mask) is away from the film. In one embodiment, the thickness of the mask 506 is such that, when placed against the film, the opaque surface of the mask 506, and the openings therein, is at a distance f (equivalent to the focal length of the mask 506) from the film. Other configurations of masks 506 are possible, and the configuration of the medium- or large-format film camera with a film back 502 makes it possible to easily change configurations of masks by simply using a different mask 506. In one embodiment, microsheets 504 of glass may be used in the assembly as spacers or shims between the mask 506 and the film in film holder 502 to increase the distance from the mask 506 and the film to allow f (equivalent to the focal length of the mask 506) to be changed, for example to match a changed F/number for main lens 530. An exemplary thickness of a microsheet 504 that may be used is 0.23 mm. Additional microsheets 404 may be added to provide additional spacing. The ability to insert or remove microsheet glass 504, to insert or remove one or more microsheets 504 of glass, and the availability of microsheet glass 504 in different, precisely known thicknesses may provide spacing in a rigorously controlled manner. In some embodiments, other mechanisms than microsheet glass 504 may be used as spacers between the mask 506 and film holder 502 to adjust the distance between the mask 506 and film holder 502.

As illustrated in FIG. 21, in one embodiment, the film holder 502 and mask 406 may be coupled to create assembly 510. One or more microsheets 504 may optionally be inserted between the film holder 502 and mask 506 to provide additional spacing as necessary or desired. The assembly 510 may then be inserted into the large-format film camera. The combination of the large-format film camera and the assembly 510 effectively forms a radiance camera 500. Radiance camera 500 may then be used to capture a radiance image of a scene on the film in film holder 502. The assembly 510 may then be removed from the camera 500, disassembled, and the film may be appropriately processed. The film negative and/or a print of the radiance image may then be digitized, for example using a high-resolution scanner or a device that generates digital images from negatives. The digitized radiance image may be stored to a storage device, such as a disk drive, DVD, CD, etc. The digitized radiance image may be demultiplexed according to the frequency domain demultiplexing method, implemented in a frequency domain demultiplexing module executing on a computer system.

Exemplary System

Various components of embodiments of a method for demultiplexing captured radiance in the frequency domain, as described herein, may be executed on one or more computer systems, which may interact with various other devices. One such computer system is illustrated by FIG. 22. In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, audio device 790, and display(s) 780. In some embodiments, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments, processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

System memory 720 may be configured to store program instructions and/or data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for a method for demultiplexing radiance in the frequency domain, are shown stored within system memory 720 as program instructions 725 and data storage 735, respectively. In other embodiments, program instructions and/or data may be received, sent or stored upon different types of computer-accessible media or on similar media separate from system memory 720 or computer system 700. Generally speaking, a computer-accessible medium may include storage media or memory media such as magnetic or optical media, e.g., disk or CD/DVD-ROM coupled to computer system 700 via I/O interface 730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 740.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. In addition, in some embodiments some or all of the functionality of I/O interface 730, such as an interface to system memory 720, may be incorporated directly into processor 710.

Network interface 740 may be configured to allow data to be exchanged between computer system 700 and other devices attached to a network, such as other computer systems, or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or retrieving data by one or more computer system 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

As shown in FIG. 22, memory 720 may include program instructions 725, configured to implement embodiments of a method for demultiplexing radiance in the frequency domain as described herein, and data storage 735, comprising various data accessible by program instructions 725. In one embodiment, program instructions 725 may include software elements of a method for demultiplexing radiance in the frequency domain as illustrated in the above Figures. Data storage 735 may include data that may be used in embodiments. In other embodiments, other or different software elements and data may be included.

Those skilled in the art will appreciate that computer system 700 is merely illustrative and is not intended to limit the scope of a method for demultiplexing radiance in the frequency domain as described herein. In particular, the computer system and devices may include any combination of hardware or software that can perform the indicated functions, including computers, network devices, internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. A computer-accessible medium may also include transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A camera, comprising:
   a photosensor configured to capture light projected onto the photosensor;
   a mask configured to modulate but not refract light received from a scene located in front of the camera as the received light passes through the mask;

an objective lens positioned between the mask and the photosensor, wherein the objective lens is configured to focus on a plane between the mask and the objective lens, and wherein the objective lens is configured to refract light received from the plane onto the photosensor;

wherein the camera multiplexes radiance in the frequency domain by optically mixing different spatial and angular frequency components of the light received from the scene.

2. The camera as recited in claim 1, wherein the mask comprises a grid of multiple horizontally and vertically arranged opaque linear elements that define horizontal rows and vertical columns of periodically spaced transparent openings between the opaque linear elements.

3. The camera as recited in claim 1, wherein the mask comprises an opaque surface through which there are multiple periodically spaced transparent openings arranged in horizontal rows and vertical columns.

4. The camera as recited in claim 3, wherein the openings are pinholes.

5. The camera as recited in claim 1, wherein the mask is a periodic mask.

6. The camera as recited in claim 1, wherein the mask is a non-sinusoidal periodic mask.

7. The camera as recited in claim 1, wherein the camera is configured to satisfy the equation:

$$\frac{f}{b} = F$$

where F is the F/number of the objective lens, b is the lowest frequency in the mask, and f is the distance from the mask to the plane at which the objective lens is focused.

8. The camera as recited in claim 1, wherein the photosensor is configured to capture a radiance image of the scene, wherein the captured radiance image includes the optically mixed different spatial and angular frequency components of the light received from the scene.

9. The camera as recited in claim 8, wherein the camera is configured to store the captured radiance image to a memory device.

10. The camera as recited in claim 1, wherein the photosensor is a digital medium.

11. The camera as recited in claim 10, wherein the digital medium is a charge-coupled device (CCD).

12. The camera as recited in claim 1, wherein the photosensor is a film.

13. The camera as recited in claim 1, wherein the mask is configured to be attachable to and detachable from the camera.

14. A method for capturing radiance images in the frequency domain, comprising:

receiving light from a scene at a mask, wherein the mask modulates but does not refract the light as the light passes through the mask;

receiving light that passes through the mask at an objective lens of a camera, wherein the objective lens is focused on a plane behind the mask; and refracting light from the objective lens onto a photosensor of the camera;

wherein the camera multiplexes radiance in the frequency domain by optically mixing different spatial and angular frequency components of the light received from the scene.

15. The method as recited in claim 14, wherein the mask comprises a grid of multiple horizontally and vertically arranged opaque linear elements that define horizontal rows and vertical columns of periodically spaced transparent openings between the opaque linear elements.

16. The method as recited in claim 14, wherein the mask comprises an opaque surface through which there are multiple periodically spaced transparent openings arranged in horizontal rows and vertical columns.

17. The method as recited in claim 16, wherein the openings are pinholes.

18. The method as recited in claim 14, wherein the mask is a periodic mask.

19. The camera as recited in claim 14, wherein the mask is a non-sinusoidal periodic mask.

20. The method as recited in claim 14, wherein the camera is configured to satisfy the equation:

$$\frac{f}{b} = F$$

where F is the F/number of the objective lens, b is the lowest frequency in the mask, and f is the distance from the mask to the plane at which the objective lens is focused.

21. The method as recited in claim 14, further comprising capturing a radiance image of the scene at the photosensor, wherein the captured radiance image includes the optically mixed different spatial and angular frequency components of the light received from the scene.

22. The method as recited in claim 21, further comprising demultiplexing the captured radiance image in the frequency domain to produce multiple parallax views of the scene.

23. The method as recited in claim 14, further comprising storing the captured radiance image to a memory device.

24. The method as recited in claim 14, wherein the photosensor is a digital medium.

25. The method as recited in claim 14, wherein the photosensor is a film.

* * * * *